US012070952B2

(12) United States Patent
Sato et al.

(10) Patent No.: US 12,070,952 B2
(45) Date of Patent: Aug. 27, 2024

(54) RECORDING APPARATUS AND CONTROL METHOD THEREFOR

(71) Applicant: CANON KABUSHIKI KAISHA, Tokyo (JP)

(72) Inventors: Takaya Sato, Tokyo (JP); Ryohei Maruyama, Kanagawa (JP); Daigo Kuronuma, Kanagawa (JP); Kenta Iimura, Kanagawa (JP); Tomohito Abe, Kanagawa (JP); Naoaki Wada, Kanagawa (JP); Masakazu Nagashima, Kanagawa (JP); Toshiaki Yamaguchi, Tokyo (JP); Ryutaro Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/488,073

(22) Filed: Sep. 28, 2021

(65) Prior Publication Data

US 2022/0097390 A1 Mar. 31, 2022

(30) Foreign Application Priority Data

Sep. 30, 2020 (JP) ................................ 2020-166311

(51) Int. Cl.
*B41J 2/175* (2006.01)
*B41J 2/045* (2006.01)

(52) U.S. Cl.
CPC ........... *B41J 2/17503* (2013.01); *B41J 2/045* (2013.01)

(58) Field of Classification Search
CPC ..... B41J 2/175; B41J 2/18; B41J 29/38; B41J 2/17596; B41J 19/202; B41J 2/045;
(Continued)

(56) References Cited

U.S. PATENT DOCUMENTS 7,156,507 B2 1/2007 Aruga
7,198,361 B2 4/2007 Hida
(Continued)

FOREIGN PATENT DOCUMENTS

AU 2016277630 A1 7/2017
CN 101209623 A 7/2008
(Continued)

*Primary Examiner* — Jannelle M Lebron
(74) *Attorney, Agent, or Firm* — CANON U.S.A., INC. IP Division

(57) ABSTRACT

A recording apparatus includes a carriage, a tank, and a flow passage. The carriage includes a liquid ejecting recording head and reciprocates in first and second directions. The flow passage supplies liquid from the tank to the recording head, and includes a fixed flow passage, a first flow passage, and a second flow passage. The fixed flow passage is connected to the tank and does not to follow a movement of the carriage. The first flow passage is branched off from the fixed flow passage, is connected to the recording head in the first direction, and follows the carriage movement. The second flow passage is branched off from the fixed flow passage, is connected to the recording head in the second direction, and follows the carriage movement. After the carriage moves in the first direction, stops, and moves in the second direction, liquid is sucked from the recording head.

17 Claims, 22 Drawing Sheets

(58) Field of Classification Search
CPC .......................... B41J 2/16523; B41J 2/17503; B41J 2/17509; B41J 2/1752; B41J 2/17566; B41J 25/001
See application file for complete search history.

(56) References Cited

U.S. PATENT DOCUMENTS

| | | | | |
|---|---|---|---|---|
| 8,851,647 | B2 | 10/2014 | Ito | |
| 8,960,829 | B2 | 2/2015 | Iwata | |
| 9,616,673 | B2 | 4/2017 | Domae | |
| 2006/0209140 | A1 | 9/2006 | Nagai | |
| 2009/0085950 | A1 | 4/2009 | Takata | |
| 2011/0115844 | A1 | 5/2011 | Ozawa | |
| 2013/0021396 | A1 | 1/2013 | Hirano | |
| 2015/0273822 | A1* | 10/2015 | Teraji | B41J 2/04586 347/9 |
| 2015/0314607 | A1 | 11/2015 | Moriguchi | |
| 2019/0299606 | A1 | 10/2019 | Matsuura | |
| 2020/0101733 | A1* | 4/2020 | Hagiwara | B41J 2/17509 |

FOREIGN PATENT DOCUMENTS

| | | | |
|---|---|---|---|
| CN | 102066115 | A | 5/2011 |
| CN | 102642402 | A | 8/2012 |
| CN | 103085492 | A | 5/2013 |
| CN | 103223774 | A | 7/2013 |
| CN | 106061745 | A | 10/2016 |
| CN | 106985529 | A | 7/2017 |
| CN | 108569033 | A | 9/2018 |
| CN | 109130522 | A | 1/2019 |
| JP | S57115350 | A | 7/1982 |
| JP | S62109653 | A | 5/1987 |
| JP | H05238017 | A | 9/1993 |
| JP | 2004114411 | A | 4/2004 |
| JP | 2008055646 | A | 3/2008 |
| JP | 2010247401 | A | 11/2010 |
| JP | 2015009412 | A | 1/2015 |

* cited by examiner

RECORDING APPARATUS AND CONTROL METHOD THEREFOR

BACKGROUND

Field

The present disclosure relates to a recording apparatus that records an image and a control method for the recording apparatus.

Description of the Related Art

In a conventional recording apparatus configured to perform recording by ejecting ink while reciprocating a carriage on which a recording head is mounted, ink in ink tubes that are coupled to the carriage is moved by an inertia force generated when the carriage changes direction. Japanese Patent Application Laid-Open No. 2010-247401 discusses a configuration in which two tubes are coupled to both ends of a recording head in a moving direction in a manner forming a loop shape, so as to prevent ink that has moved in the tubes from flowing into the recording head and increasing the pressure in the recording head. In the configuration discussed in Japanese Patent Application Laid-Open No. 2010-247401, however, if there is a difference in flow passage resistance between the two tubes when a discharge operation for discharging ink from a flow passage is executed, ink can remain in the flow passage with a large flow passage resistance.

SUMMARY

According to an aspect of the present disclosure, a recording apparatus includes a carriage including a recording head configured to eject liquid, wherein the carriage is configured to reciprocate in a first direction along a scanning direction and in a second direction opposite to the first direction, a tank configured to contain liquid to be supplied to the recording head, a flow passage configured to supply liquid from the tank to the recording head, and a suction unit configured to suck liquid from the recording head, wherein the flow passage includes a fixed flow passage, a first flow passage, and a second flow passage, wherein the fixed flow passage is connected to the tank and configured not to follow a movement of the carriage, wherein the first flow passage is branched off from the fixed flow passage, is connected to the recording head in the first direction, and is configured to follow the movement of the carriage, wherein the second flow passage is branched off from the fixed flow passage, is connected to the recording head in the second direction, and is configured to follow the movement of the carriage, and wherein, after the carriage is caused to move in the first direction and to stop for a predetermined period and is further caused to move in the second direction, the suction unit sucks liquid from the recording head.

An example of the disclosed recording apparatus is directed to reducing an amount of residual liquid in a flow passage during a liquid discharge operation. Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. However, the following exemplary embodiments are not intended to limit the present disclosure. Further, not all combinations of features described in the exemplary embodiments are essential. The relative arrangement, shapes, and the like of components described in the exemplary embodiments are merely examples, and the scope of the disclosure is not limited only to the exemplary embodiments.

Outline of Apparatus

Figure 1A:
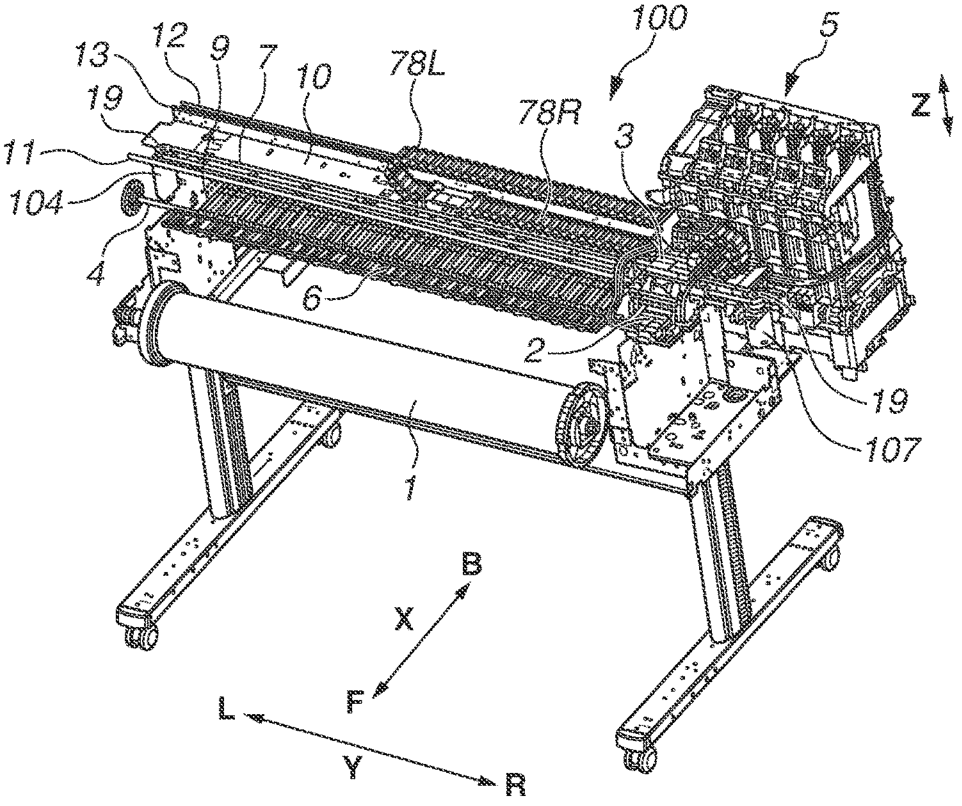
FIGS. 1A and 1B are views each illustrating a schematic configuration of an inkjet recording apparatus according to a first exemplary embodiment.
Figure 1B:
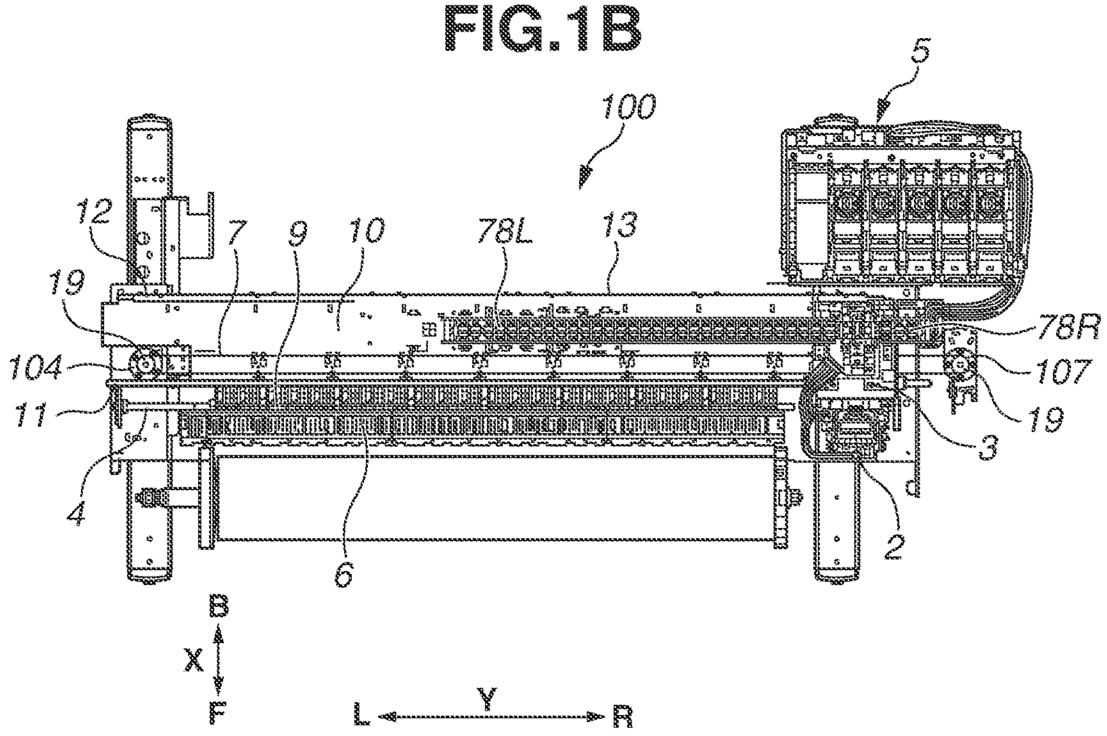

First, a schematic configuration of an inkjet recording apparatus (hereinafter referred to as a recording apparatus) 100 that is applied as a recording apparatus according to a first exemplary embodiment of the present disclosure will be described with reference to the drawings. FIG. 1A is a perspective view illustrating a schematic configuration of the recording apparatus 100, and FIG. 1B is a top view of the recording apparatus 100. In FIGS. 1A and 1B, an arrow X indicates a front-back direction (depth direction) in a front view of the recording apparatus 100, "F" corresponds to a front side, and "B" corresponds to a back side. An arrow Y indicates a right-left direction (width direction) in the front view of the recording apparatus 100, "L" corresponds to a left side, and "R" corresponds to a right side. An arrow Z indicates a top-bottom direction of the recording apparatus 100.

The recording apparatus 100 includes a recording unit including a recording head 2 and a carriage 3. The recording head 2 includes ejection ports for ejecting ink. The recording head 2 is mounted on the carriage 3, and the carriage 3 is configured to reciprocate. The carriage 3 reciprocates along the Y-direction. At one end in a movable range of the carriage 3, a first carriage motor 104 to which a driving pulley 19 is connected is disposed. At the other end in the movable range of the carriage 3, a second carriage motor 107 to which a driving pulley 19 is connected is disposed.

A timing belt 7 is suspended between the two carriage motors 104 and 107, and the carriage 3 is mounted on a part of the timing belt 7. The carriage 3 is caused to move for scanning by these scanning units. Thus, since the carriage 3 is driven by the two carriage motors 104 and 107, an output can be increased as compared with a case where the carriage 3 is driven by a single carriage motor, and thus the carriage 3 can be caused to move for scanning at a high speed even in a case where the carriage 3 is heavy in weight.

Further, a linear scale 13 that extends in a scanning direction (Y-direction) of the carriage 3 and an encoder sensor 14 that is mounted on the carriage 3 and reads the linear scale 13 are provided as a position detection mechanism for detecting the position of the carriage 3. The position detection mechanism is used to control the position and the speed of the carriage 3.

The carriage 3 is guided and supported by a first guide rail 11 and a second guide rail 12. The first guide rail 11 and the second guide rail 12 are disposed separately from each other in the X-direction and are supported by a main body frame 10. The carriage 3 reciprocates along the direction (Y-direction) in which the first guide rail 11 and the second guide rail 12 extend. A direction in which the carriage 3 performs scanning toward the L-side in FIGS. 1A and 1B is hereinafter referred to as a "forward direction", and a direction in which the carriage 3 performs scanning toward the R-side in FIGS. 1A and 1B is referred to as a "reverse direction".

In the recording apparatus 100, a rolled sheet 1 serving as a recording medium is placed in a sheet feed portion that is provided at the front side of the recording apparatus 100. The sheet 1 fed into the recording apparatus 100 is conveyed to a position opposed to the recording unit (recording head 2) in a state where the sheet 1 is nipped between a conveyance roller 4 and a pinch roller 9. The conveyance roller 4 is rotationally driven, and the pinch roller 9 rotates following the conveyance roller 4.

A platen 6 is disposed at a position opposed to the recording unit (recording head 2), and an image is recorded by the recording head 2 on the recording medium based on data in a state where the back surface of the recording medium is supported on the platen 6. The recording head 2 ejects ink droplets while moving in the scanning direction (Y-direction) along with the carriage 3, and records an image having a predetermined length (image corresponding to one band) on the sheet 1 (recording operation). When the image corresponding to one band is recorded on the recording medium, the recording medium is conveyed by a predetermined amount by a conveyance unit (intermittent conveyance operation). The image is recorded on the entire recording medium based on image data by a serial recording method in which the one-band image recording operation and the intermittent conveyance operation are repeated.

The recording head 2 according to the present exemplary embodiment includes a unit (e.g., a heating resistance element) that generates thermal energy as an energy used to eject ink, and uses a method for causing a state change (film boiling) in ink by the thermal energy. With this configuration, higher-density, higher-precision image recording can be achieved. According to the present exemplary embodiment, not only the method using the thermal energy as described above, but also a method using a piezoelectric transducer can be used.

Figure 2:
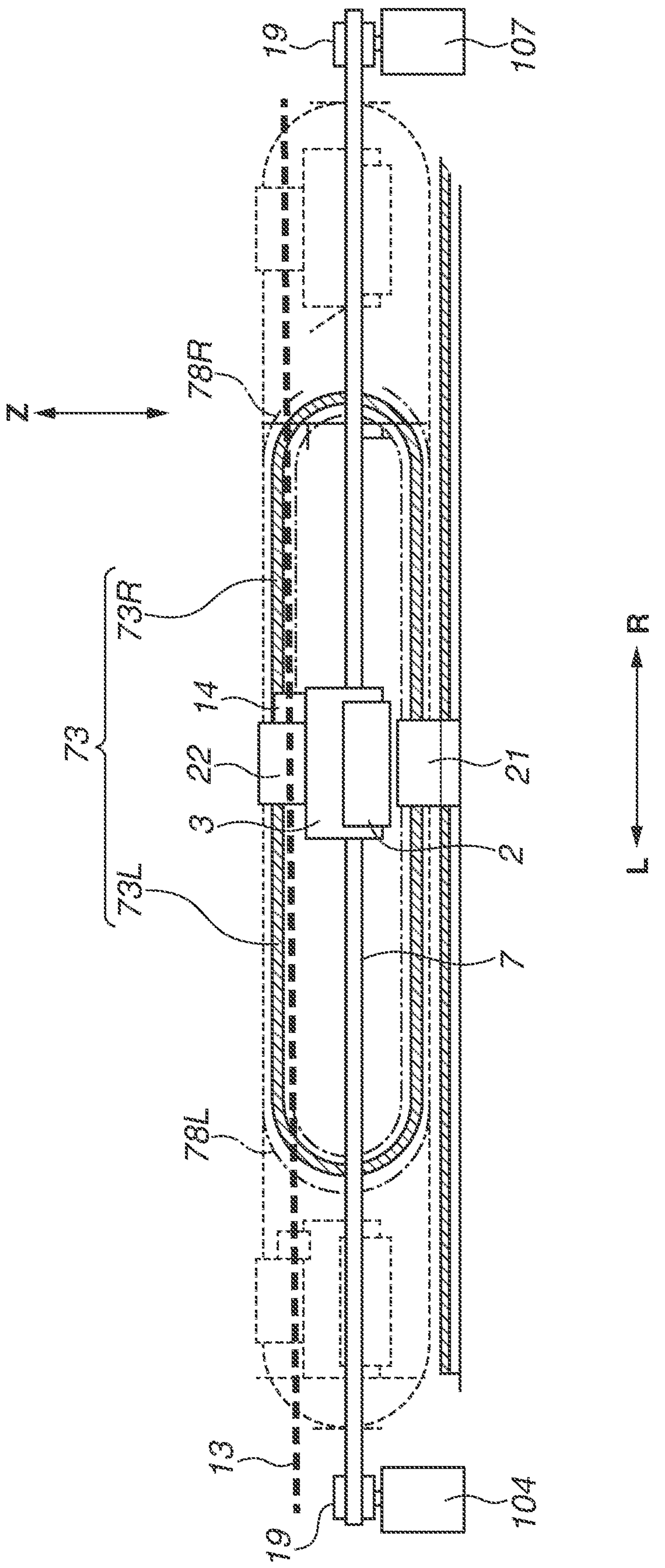
FIG. 2 is a schematic front view illustrating a configuration of a carriage and a peripheral portion thereof according to the first exemplary embodiment.

FIG. 2 is a schematic front view illustrating the configuration of the carriage 3 and a peripheral portion thereof. As illustrated in FIGS. 1A and 1B, a plurality of ink tanks 5 that contain respective colors of ink to be supplied to the recording head 2 is mounted on the back surface of the recording apparatus 100. Ink is supplied from each of the ink tanks 5 to the recording head 2 through a flexible ink tube provided for each color of ink. Each of a movable tube 73R and a movable tube 73L illustrated in FIG. 2 is a bundle of a plurality of ink tubes and is configured to move along with a movement of the carriage 3. The movable tubes 73R and 73L are also hereinafter collectively referred to as the movable tube 73.

One end of the movable tube 73R is connected to the carriage 3, and the other end of the movable tube 73R is connected to a fixed portion joint 21 that is fixed to the recording apparatus 100. The movable tube 73R is disposed to be curved in a U-shape on R-side in the Y-direction. One end of the movable tube 73L is connected to the carriage 3, and the other end of the movable tube 73L is connected to the fixed portion joint 21 that is fixed to the recording apparatus 100. The movable tube 73L is disposed to be curved in a U-shape on the L-side in the Y-direction. In the present exemplary embodiment, the number of tubes in the bundle, length, material, and the like of the movable tube 73R are the same as those of the movable tube 73L, and only the curved direction of the movable tube 73R is different from the curved direction of the movable tube 73L.

To guide the deformation of the movable tubes 73R and 73L along with the reciprocating movement of the carriage 3, the recording apparatus 100 includes a tube holding member 78R and a tube holding member 78L. Each of the tube holding members 78R and 78L according to the present exemplary embodiment is a chain link (cable carrier) formed by connecting a plurality of link members. Each link member is a ring-shaped member through which a tube can be inserted, and the adjacent link members are rotatably connected together about an X-direction axis.

The tube holding members 78R and 78L are each curved in a U-shape in the Y-direction and are deformed while changing a curved portion to follow the reciprocating movement of the carriage 3. In the present exemplary embodiment, the tube holding member 78R and the tube holding member 78L are similar to each other, e.g., the number of link members connected of the tube holding member 78R are the same as that of the tube holding member 78L. The movable tube 73R is inserted into the tube holding member 78R and the movable tube 73L is inserted into the tube holding member 78L.

Figure 3:
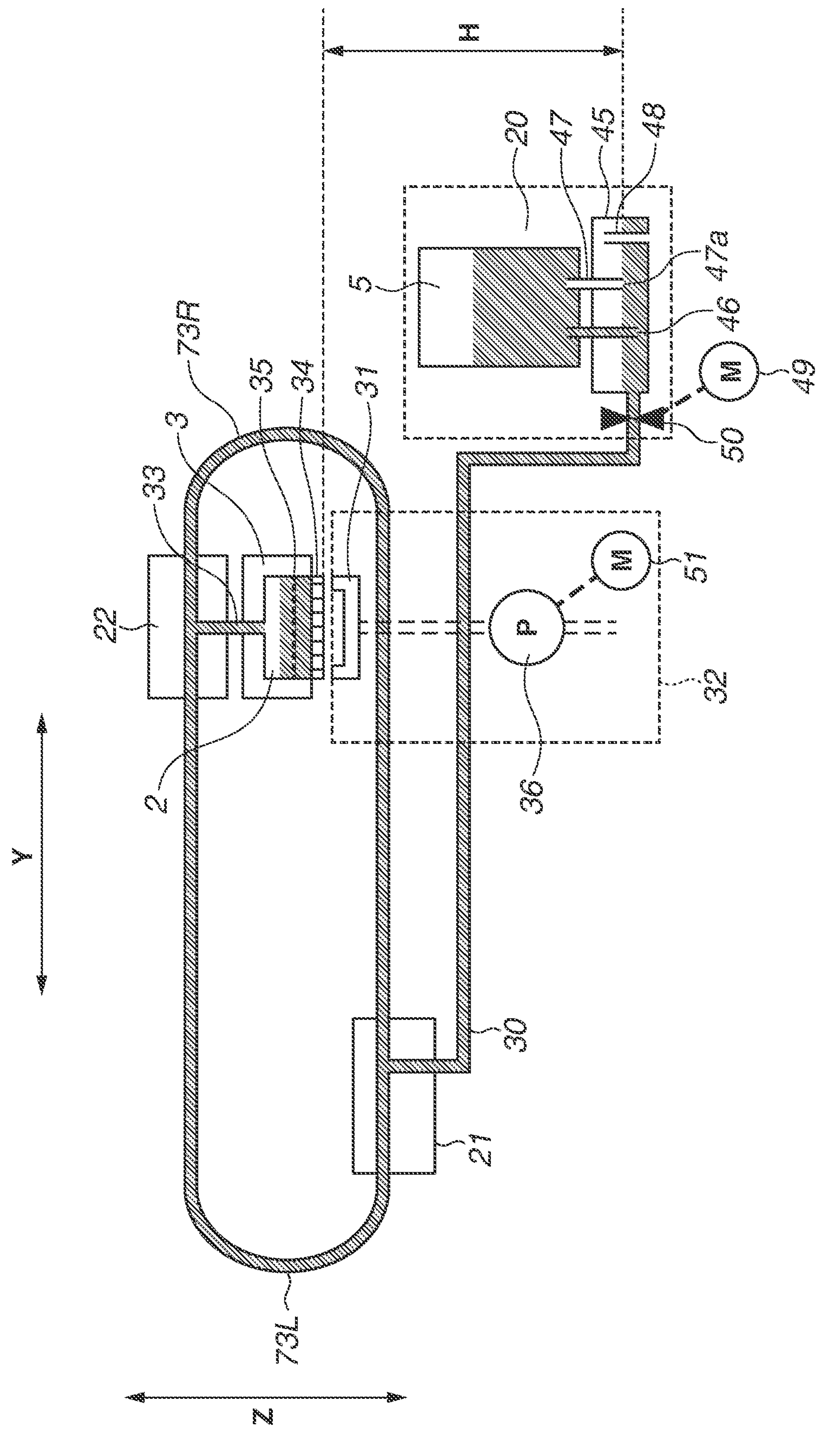
FIG. 3 is a conceptual schematic diagram illustrating a flow passage for ink of a single color according to the first exemplary embodiment.

Next, a configuration of an ink flow passage will be described. FIG. 3 is a conceptual schematic diagram illustrating a flow passage for ink of a single color. A reserve tank 45 that is fixed to the recording apparatus 100 is disposed below each of the ink tanks 5 that are detachably mounted on the recording apparatus 100 by a user. Further, an ink supply path 46 for supplying ink from the ink tank 5 to the reserve tank 45 and an air introduction path 47 for introducing air from the reserve tank 45 to the ink tank 5 are provided between the ink tank 5 and the reserve tank 45. The reserve tank 45 includes an atmosphere communication portion 48 for communicating with the atmosphere and is opened to the atmosphere.

When the ink tank 5 is mounted on the recording apparatus 100 by the user, the ink tank 5 and the reserve tank 45 are connected through the ink supply path 46 and the air introduction path 47. The ink contained in the ink tank 5 is supplied to the reserve tank 45 through the ink supply path 46 due to a water head difference, and the amount of air corresponding to the amount of supplied ink is introduced into the ink tank 5 from the atmosphere communication portion 48 through the air introduction path 47. In other words, the gas-liquid exchange between the ink contained in the ink tank 5 and the air in the reserve tank 45 enables the ink to be supplied to the reserve tank 45.

When the ink level in the reserve tank 45 increases as the ink is supplied to the reserve tank 45, an opening 47*a* of the air introduction path 47 is sealed. Accordingly, the movement of air from the reserve tank 45 to the ink tanks 5 is stopped, so that the supply of ink from the ink tank 5 to the reserve tank 45 is also stopped. When the ink contained in the reserve tank 45 is consumed to eject the ink from the recording head 2 and the ink level decreases, the air is introduced into the ink tank 5 through the air introduction path 47 and the ink is automatically supplied from the ink tank 5 to the reserve tank 45. According to the ink supply method as described above, the ink level in the reserve tank 45 is located substantially at the same height as the opening 47*a* until all the ink contained in the ink tank 5 is consumed.

The reserve tank 45 is coupled to a fixed tube 30 that is a fixed flow passage fixed to the recording apparatus 100, and a choke valve 50 is disposed between the reserve tank 45 and the fixed tube 30. Since the fixed tube 30 is fixed to the recording apparatus 100, the fixed tube 30 does not follow the movement of the carriage 3. The choke valve 50 is driven by a choke valve motor 49 to close and open the flow passage between the reserve tank 45 and the recording head 2.

The other end of the fixed tube 30 is coupled to the fixed portion joint 21, and the flow passage is branched in the fixed portion joint 21 and is coupled to the movable tubes 73R and 73L. The other end of each of the movable tubes 73R and 73L is connected to a carriage joint 22 that is provided on the carriage 3. Respective ink flow passages formed by the movable tubes 73R and 73L in the carriage joint 22 merge with each other, and ink is supplied to the recording head 2 through a carriage tube 33 that is provided in the carriage 3.

In such a manner, ink is supplied from the ink tank 5 to the recording head 2 in two directions through the movable tube 73R and the movable tube 73L in the present exemplary embodiment. The movable tubes 73R and 73L are connected to the carriage joint 22 and the recording head 2 from different directions in a movement direction (Y-direction) of the carriage 3. Specifically, the movable tubes 73R and 73L form a loop ink flow passage, which extends on a Y-Z plane defined by the Y-direction and the Z-direction (gravitational direction), for each color of ink.

The recording head 2 includes an ejection port surface 34 where a plurality of ejection ports are arranged on the bottom surface of the recording head 2, and a filter 35 for removing foreign substances contained in the ink to be supplied to the ejection ports. On the ejection port surface 34, an inkjet energy generating element, such as a heater or a piezo element, is provided, and ink droplets are ejected from the ejection ports by an inkjet method. The ejection port surface 34 is disposed at a position higher than the opening 47*a* of the air introduction path 47 that communicates with the atmosphere. In the present exemplary embodiment, the difference of height (water head difference H) between the ejection port surface 34 and the opening 47*a* (ink level in the reserve tank 45) is set to about 80 mm.

When the recording head 2 is filled with ink, a negative pressure of about −0.8 kilopascal (kPa) is applied in the recording head 2 due to the water head difference H. Further, the ink in each of the fine ejection ports on the ejection port surface 34 forms a meniscus, which prevents the air from flowing back into the recording head 2 from the ejection port surface 34. When ink is ejected from the ejection ports during the recording operation and the ink in the recording head 2 is consumed, the amount of ink equivalent to the amount of consumed ink is supplied from the reserve tank 45 to the ejection ports. This ink supply method is referred to as a water head difference supply method.

Next, a configuration of a recovery unit 32 that performs a recovery operation to maintain the ejection performance of the recording head 2 will be described. The recovery unit 32 is disposed on the R-side in the Y-direction. The recovery unit 32 is provided with a cap 31 and a suction pump 36. The cap 31 is used to seal the ejection port surface 34 of the recording head 2. The suction pump 36 is connected to the cap 31 and generates a negative pressure in the cap 31. The cap 31 and the suction pump 36 constitute a suction unit that sucks ink from the recording head 2. The suction pump 36 according to the present exemplary embodiment is a tube pump. The suction pump 36 is rotated by driving a suction pump motor 51.

When the suction pump motor 51 is driven in a state where the ejection port surface 34 is capped with the cap 31, a negative pressure is generated in the cap 31, which causes the recovery unit 32 to forcibly suck ink from the ejection ports. This suction operation makes it possible to suck out the ink or the like that is adhered in the vicinity of the ejection ports, thereby maintaining a good ejection state. The ink sucked by the suction pump 36 is discharged to a waste ink container (not illustrated).

Figure 4:
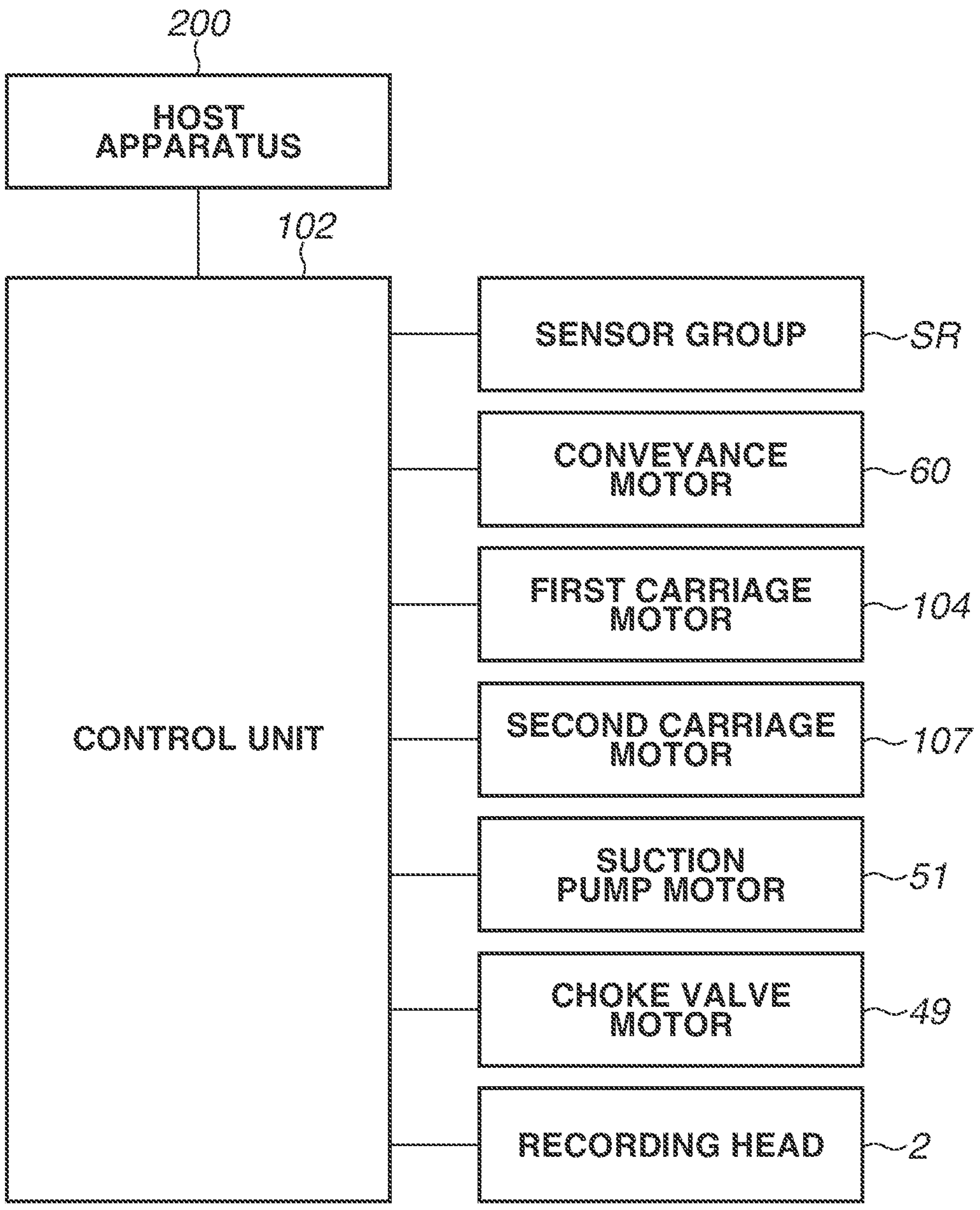
FIG. 4 is a block diagram illustrating an internal configuration of the inkjet recording apparatus according to the first exemplary embodiment.

FIG. 4 is a block diagram illustrating an internal configuration of the recording apparatus 100. A control unit 102 receives image data and a recording instruction for the image data from a host apparatus 200 and executes the recording operation. The control unit 102 includes a processing unit, a storage unit, and an interface unit, and controls the overall operation of the recording apparatus 100. The processing unit is a processor typified by a central processing unit (CPU), and executes programs stored in the storage unit. The storage unit is a storage device, such as a random access memory (RAM) or a read-only memory (ROM), and stores programs and data.

The control unit 102 controls a conveyance motor 60 that drives the conveyance roller 4 based on detection results from a sensor group SR, the first carriage motor 104, the second carriage motor 107, the recording head 2, the suction pump motor 51, the choke valve motor 49, and the like. The sensor group SR includes an encoder sensor 14.

A pressure fluctuation in the recording head 2 that occurs during the recording operation with the configuration as described above will be described. When the carriage 3 is caused to reciprocate, the movable tube 73 that is coupled thereto via the carriage joint 22 also moves to follow the movement of the carriage 3. In this configuration, when the carriage 3 changes direction, an inertia force acts on the ink in the ink flow passage including the movable tube 73.

A schematic example in which the ink flow passage is simply branched in the inside of the fixed portion joint 21 and the inside of the carriage joint 22 will now be described with reference to FIGS. 5A to 5D. FIGS. 5A to 5D sequentially illustrate a state where the carriage 3 moves.

Figure 5A:
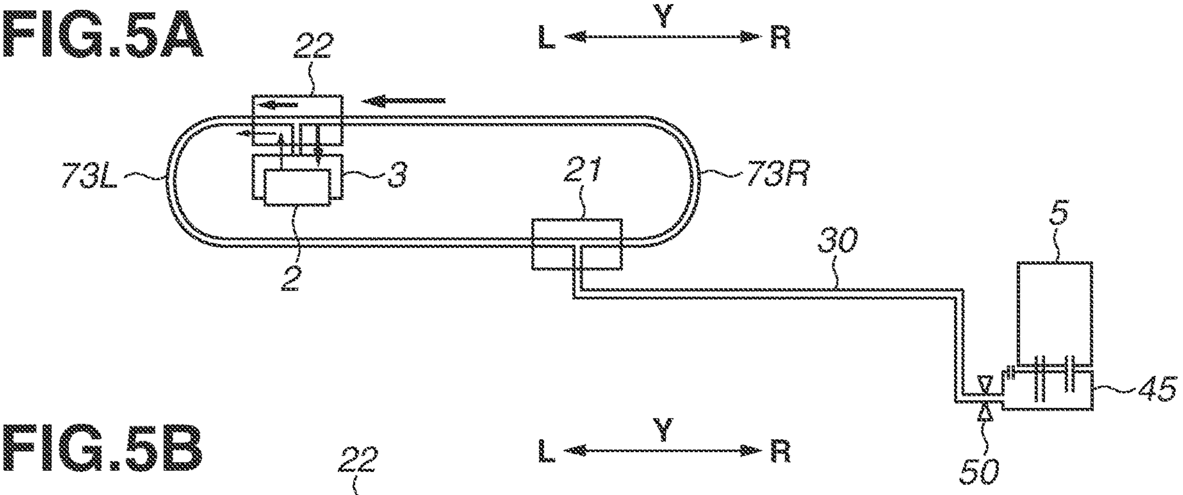
FIGS. 5A to 5D schematically illustrate an example of an ink flow passage that is simply branched inside a fixed portion joint and inside a carriage joint.
Figure 5B:
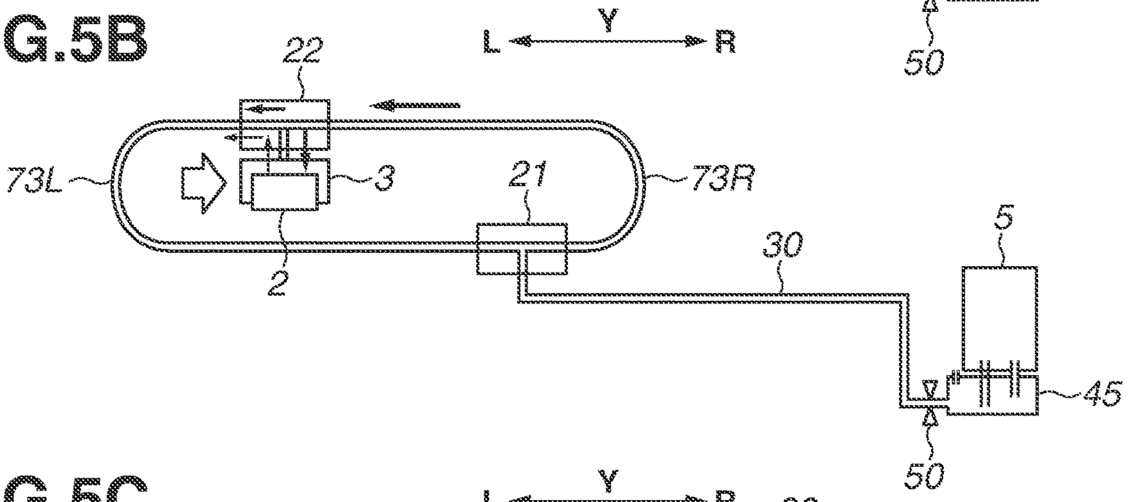

FIG. 5A illustrates a state where the carriage 3 is decelerated to change the moving direction from the forward direction to the reverse direction at the L-side end. FIG. 5B illustrates a state where the carriage 3 is accelerated to move toward the R-side after the reverse movement. As illustrated in FIGS. 5A and 5B, when the carriage 3 is decelerated and accelerated for the reverse movement at the L-side end, the ink in the movable tube 73R is dispersed and moved into the movable tube 73L and the recording head 2 by the inertia force. On the other hand, when the inertia force acts in a direction away from the recording head 2, a force that causes the ink to flow back into the recording head 2 acts on the ink in the movable tube 73L. As a result, the amount of ink in the movable tube 73R that is moved into the recording head 2 is larger than the amount of ink in the recording head 2 that is moved into the movable tube 73L, so that the pressure in the recording head 2 increases.

Figure 5C:
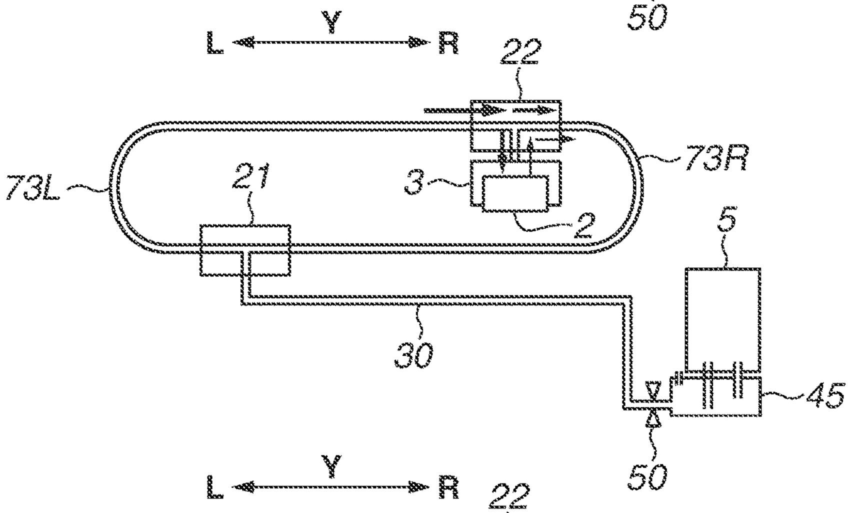
Figure 5D:
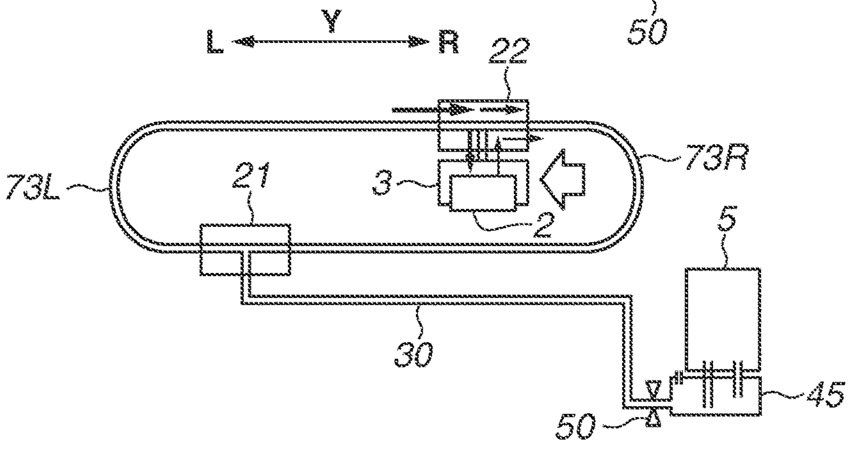

FIG. 5C illustrates a state where the carriage 3 is decelerated to change the moving direction from the reverse direction to the forward direction at the R-side end. FIG. 5D illustrates a state where the carriage 3 is accelerated to move toward the L-side after the reverse movement. The pressure in the recording head 2 that has increased due to the acceleration or deceleration at the L-side end gradually decreases as the pressure is restored to the level corresponding to the water head difference while the carriage 3 is moving in the reverse direction from the L-side to the R-side at a constant speed. However, as illustrated in FIGS. 5C and 5D, also when the carriage 3 is decelerated and accelerated for the reverse movement at the R-side end, the ink is moved due to the inertia force, which causes the pressure in the recording head 2 to increase again.

Specifically, the ink in the movable tube 73L is dispersed and moved to the movable tube 73R and the recording head 2 by the inertia force. On the other hand, when the inertia force acts in a direction away from the recording head 2, the force that causes the ink to flow back into the recording head 2 acts on the ink in the movable tube 73R. As a result, the amount of ink in the movable tube 73L that is moved into the recording head 2 is larger than the amount of ink in the recording head 2 that is moved into the movable tube 73R, so that the pressure in the recording head 2 increases.

Figure 6:
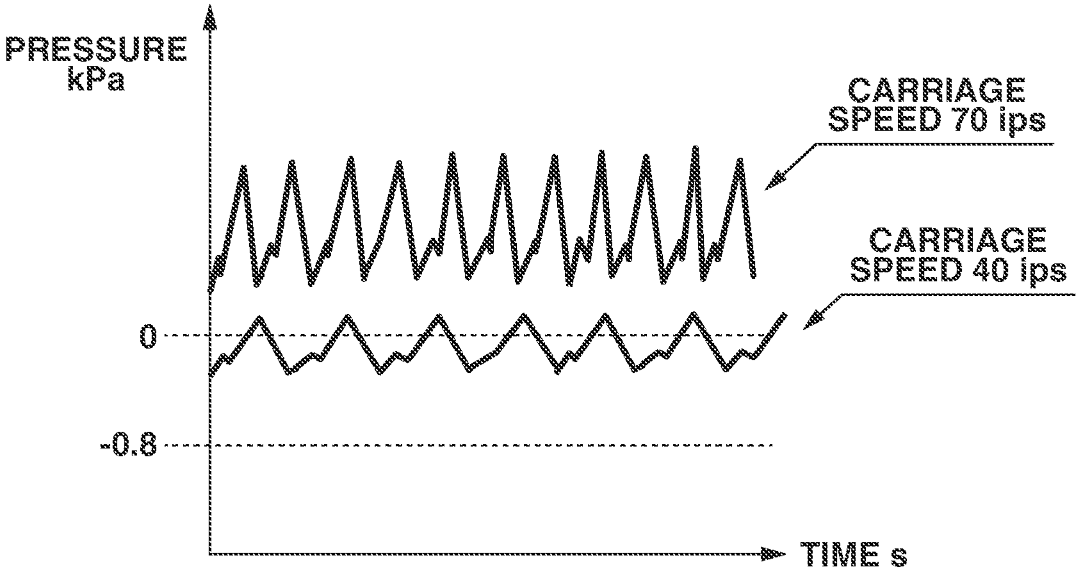
FIG. 6 is a graph illustrating a pressure fluctuation in a recording head of the recording apparatus including the ink flow passage illustrated in FIGS. 5A to 5D.

When the carriage 3 is repeatedly moved as illustrated in FIGS. 5A to 5D during the recording operation, the pressure on the ejection port surface 34 of the recording head 2 during printing fluctuates at a pressure level that is higher than the normal water head difference (−0.8 kPa) as illustrated in FIG. 6. If the carriage 3 is moved at a low speed, the inertia force acting on the ink is small and thus the value of an increase in pressure is also small. However, if the movement speed of the carriage 3 is increased for high-speed printing, the inertia force acting on the ink is large and thus the pressure in the recording head 2 is more likely to increase.

For example, when the carriage 3 moves for scanning at a movement speed of 40 inches-per-second (ips), the pressure on the ejection port surface 34 fluctuates at a level of about 0 kPA. In general, the ejection port surface 34 is subjected to water-repellent treatment to prevent ink from leaking from the ejection ports even when the pressure in the recording head 2 fluctuates to some extent due to the meniscus withstanding pressure on the ejection ports. Accordingly, even when the pressure fluctuation temporarily exceeds 0 kPa, the pressure in the recording head 2 is subsequently restored to a negative pressure, thereby preventing ink from leaking from the ejection ports.

However, if the pressure in the recording head 2 increases due to the inertia force when the carriage 3 moves for scanning at a movement speed of 70 ips, the pressure on the ejection port surface 34 fluctuates in a positive pressure state. Therefore, if the positive pressure state is maintained, the ink meniscus cannot be sustained on the ejection port surface 34, so that ink is pushed out from the ejection ports and ink leakage occurs.

Figure 7:
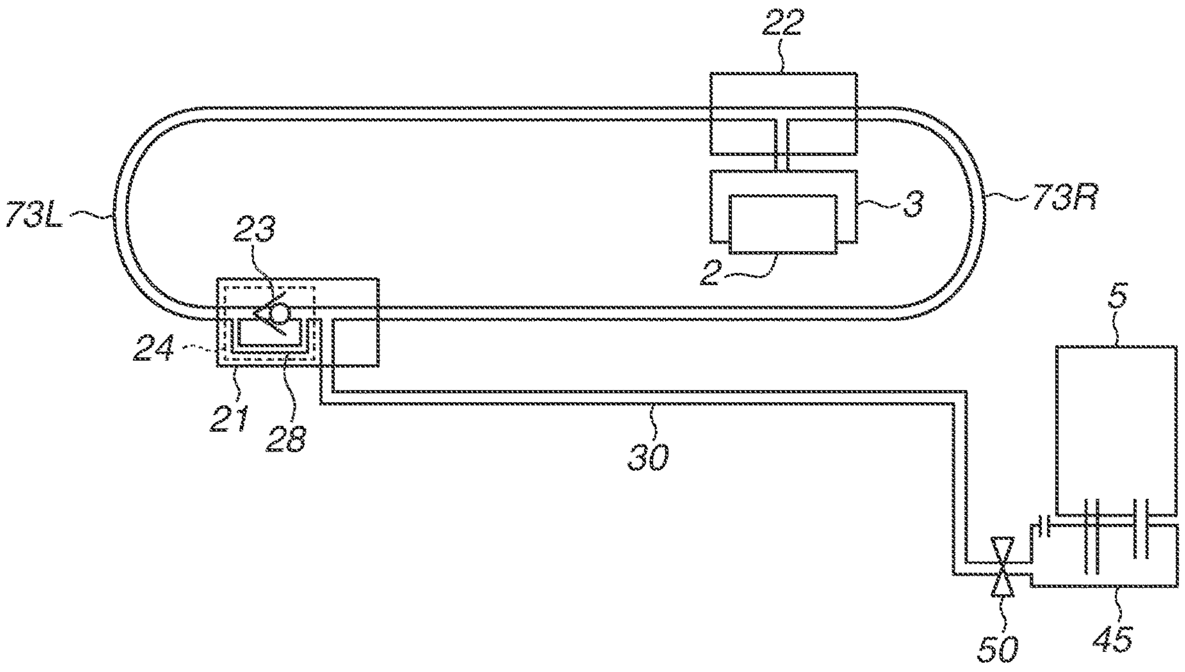
FIG. 7 is a schematic diagram illustrating a layout of an adjustment valve in the ink flow passage.

In the present exemplary embodiment, an adjustment valve 24 that limits the flow of ink toward the recording head 2 and does not limit the reverse flow of ink is disposed at a portion where the fixed portion joint 21 and the movable tube 73L are coupled together, as illustrated in FIG. 7. In other words, the adjustment valve 24 is disposed near the fixed portion joint 21. The adjustment valve 24 includes a check valve 23 and a branch flow passage 28. The check valve 23 is configured to close the flow passage to stop the flow of ink toward the recording head 2. The branch flow passage 28 connects the upstream side and the downstream side of the check valve 23. The branch flow passage 28 has a diameter smaller than that of the flow passage on which the check valve 23 is disposed, and functions to decrease the ink flow rate using a pressure loss.

An example of the ink flow passage on which the adjustment valve 24 is disposed will be described with reference to FIGS. 8A to 8D. The states of the carriage 3 illustrated in FIGS. 8A to 8D correspond to the states of movement of the carriage 3 illustrated in FIGS. 5A to 5D, respectively. FIGS. 9A and 9B are graphs each illustrating a pressure fluctuation in the ejection port surface 34 due to the movement of the carriage 3 in the ink flow passage on which the adjustment valve 24 is disposed.

Figure 8A:
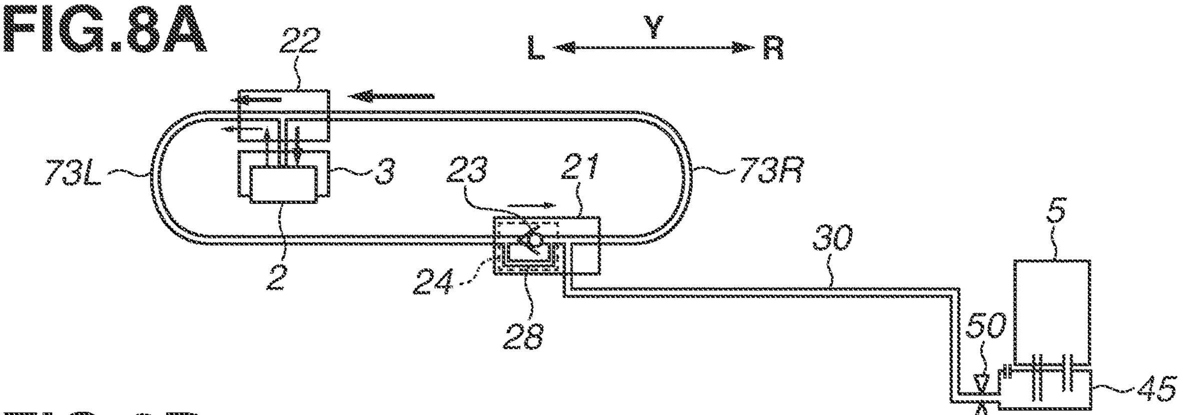
FIGS. 8A to 8D are schematic diagrams each illustrating an example of the ink flow passage on which the adjustment valve is disposed.
Figure 8B:
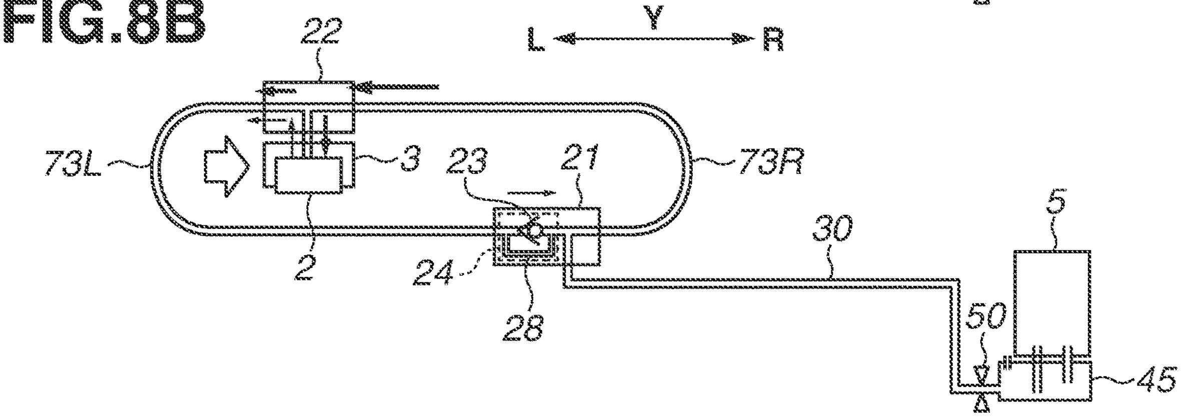
Figure 9A:
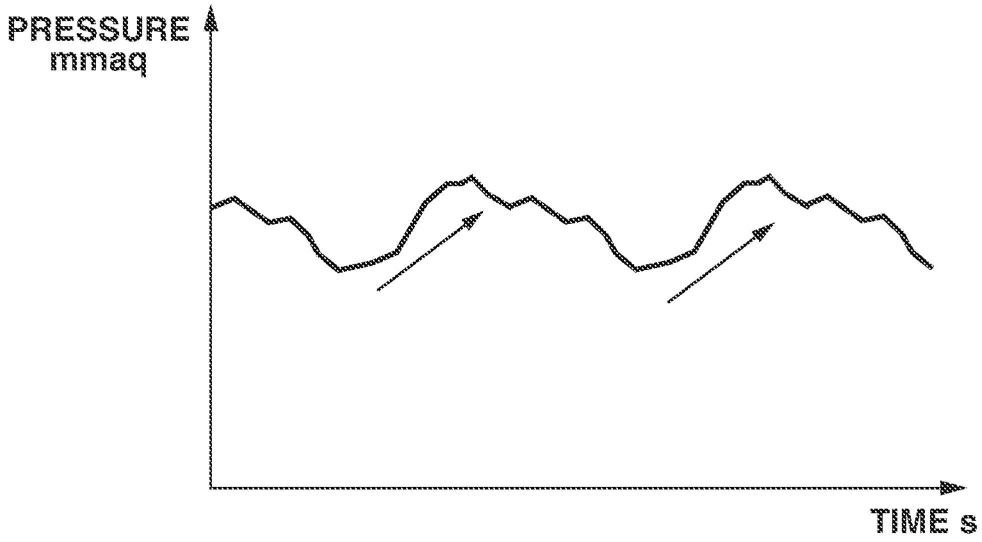
FIGS. 9A and 9B are graphs each illustrating a pressure fluctuation in the recording head of the recording apparatus including the ink flow passage on which the adjustment valve is disposed.
Figure 9B:
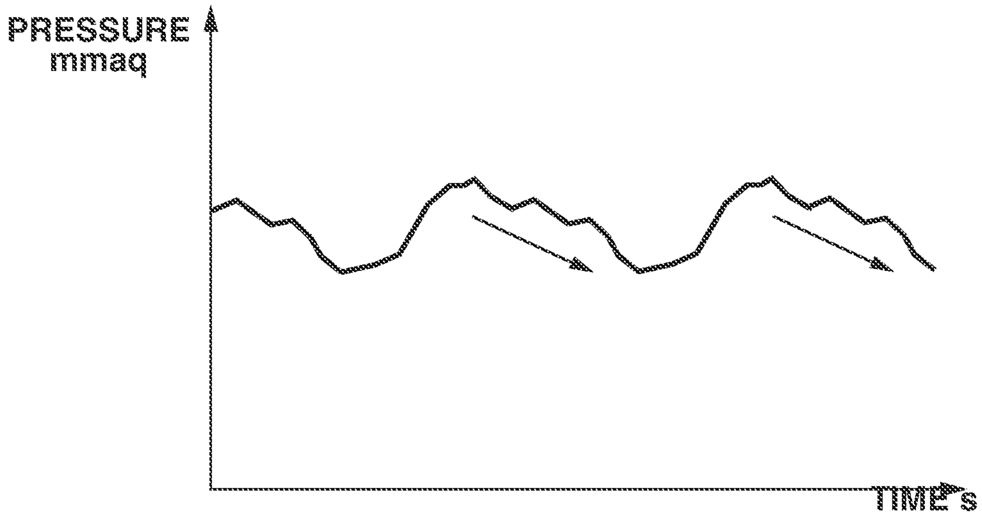

As illustrated in FIGS. 8A and 8B, when the carriage 3 is decelerated and accelerated to reverse direction at the L-side end, the ink in the recording head 2 moves in the direction in which the ink flows out to the movable tube 73L. Accordingly, the flow of ink is not stopped by the check valve 23. Further, the ink in the movable tube 73R is dispersed and moved into the movable tube 73L and the recording head 2 due to the inertia force, and the pressure in the recording head 2 increases as indicated by arrows in FIG. 9A.

Figure 8C:
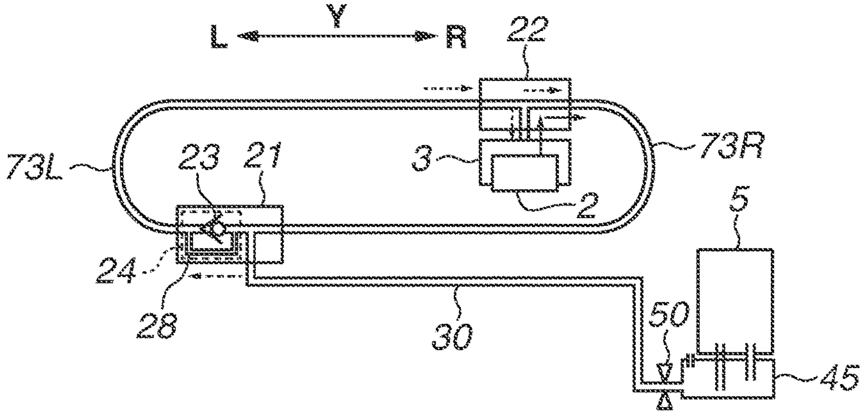
Figure 8D:
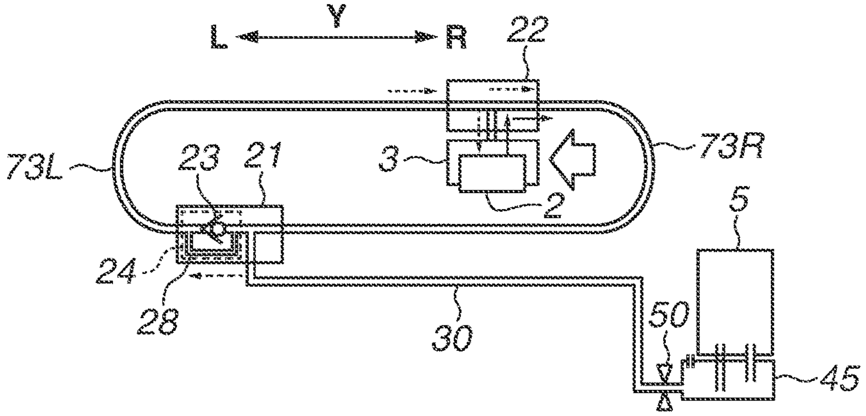

On the other hand, as illustrated in FIGS. 8C and 8D, when the carriage 3 is decelerated to reverse direction and accelerated at the R-side end, the ink in the movable tube 73L is to move in the direction in which the ink flows into the recording head 2. At this time, the flow passage is closed by the check valve 23, so that the ink moves only through the branch flow passage 28. However, the pressure loss in the branch flow passage 28 is large, and thus the ink flow rate decreases. Accordingly, the amount of ink to flow into the recording head 2 due to the inertia force in the movable tube 73L decreases. In other words, the amount of ink that flows back to the movable tube 73R from the recording head 2 due to the inertia force in the movable tube 73R is larger than the amount of ink that flows into the recording head 2 due to the inertia force in the movable tube 73L, so that the pressure in the recording head 2 can be decreased (see FIG. 9B).

It may be desirable to appropriately adjust the diameter of the branch flow passage 28 depending on a maximum carriage speed of the recording apparatus 100, the diameter of the movable tube 73, or the size of the movable range of the carriage 3. To drastically reduce the pressure in the recording head 2, a configuration for blocking ink from flowing into the recording head 2 from the movable tube 73L by providing only the check valve 23 without providing the branch flow passage 28 may be adopted.

Figure 10A:
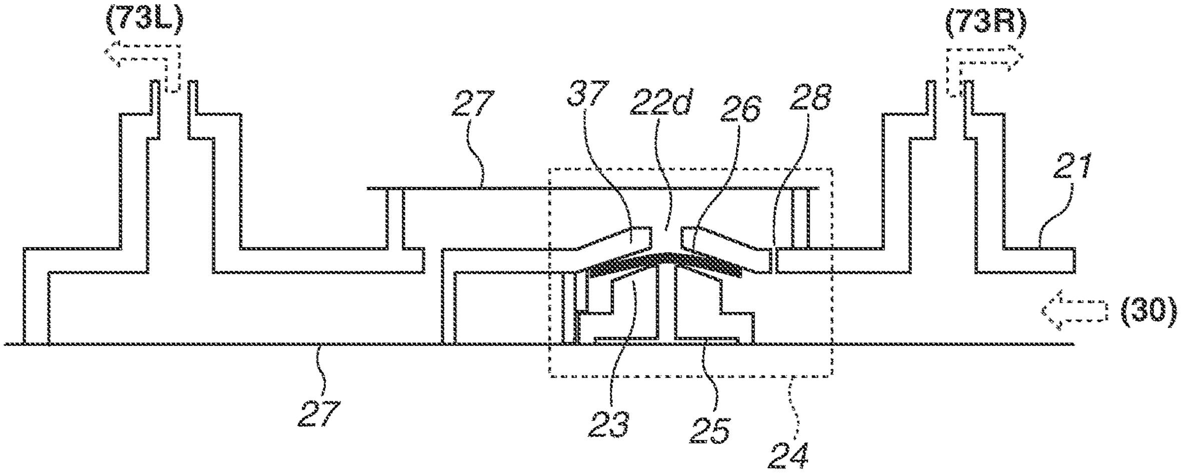
FIGS. 10A and 10B are diagrams each illustrating a peripheral portion of the adjustment valve.
Figure 10B:
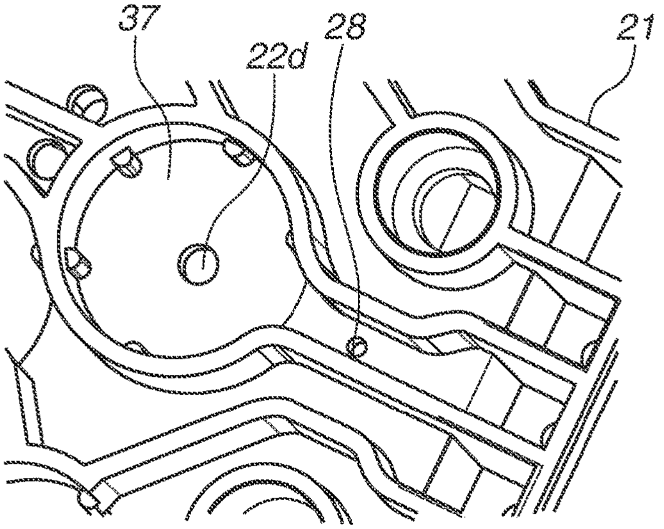
Figure 11A:
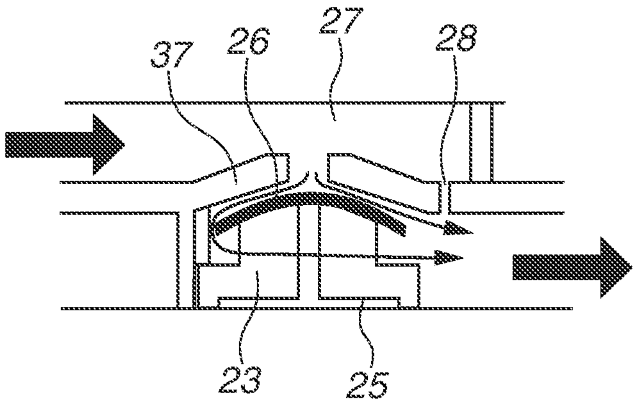
FIGS. 11A and 11B each illustrate a detailed configuration of the adjustment valve.
Figure 11B:
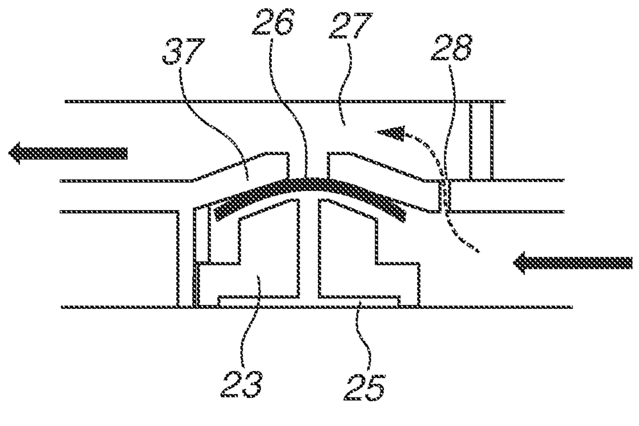

The configuration and operation of the adjustment valve 24 according to the present exemplary embodiment will be described with reference to FIGS. 10A and 10B and FIGS. 11A and 11B. FIG. 10A is a sectional view of the fixed portion joint 21, and FIG. 10B is a rear perspective view of the fixed portion joint 21. FIGS. 11A and 11B are enlarged schematic sectional views each illustrating a portion of the adjustment valve 24.

In the adjustment valve 24, a part of the fixed portion joint 21 including a valve receiving portion 37 and welded films 27 form an ink flow passage (liquid flow passage), and a circular valve sheet 26 is disposed at a position opposed to the valve receiving portion 37. The valve sheet 26 is urged by a valve cover 25 so as to prevent the valve sheet 26 from being far apart from the valve receiving portion 37. The valve sheet 26 is brought into close contact with or spaced apart from the valve receiving portion 37 depending on the flow of ink. When the valve sheet 26 is brought into close contact with the valve receiving portion 37, the ink flow is blocked to thereby form the check valve 23 as a valve member.

The adjustment valve 24 is provided with the branch flow passage 28 having a diameter smaller than that of a flow passage hole 22*d* through which ink passes when the valve sheet 26 is apart from the valve receiving portion 37. Even in a state where the valve sheet 26 is brought into close contact with the valve receiving portion 37, ink can flow through the branch flow passage 28. However, since the branch flow passage 28 has a smaller diameter, a pressure loss occurs when ink flows through the branch flow passage 28. As a result, the flow rate is considerably decreased as compared with a case where ink passes through the flow passage hole 22*d*.

FIG. 11A illustrates a state where ink flows from the recording head 2 through the movable tube 73L. When ink flows from the recording head 2 through the movable tube 73L, the valve sheet 26 is apart from the valve receiving portion 37 and ink flows in a gap formed between the valve sheet 26 and the valve receiving portion 37.

FIG. 11B illustrates a state where ink flows toward the recording head 2 from the movable tube 73L. If ink is to flow toward the recording head 2, the flow of ink attracts the valve sheet 26 toward the valve receiving portion 37 and brings the valve sheet 26 into close contact with the valve receiving portion 37. Thus, the ink passes through the branch flow passage 28, instead of passing through the gap between the valve sheet 26 and the valve receiving portion 37. With the configuration described above, the flow rate can be controlled so that the flow rate of ink that flows toward the recording head 2 can be decreased.

As described above, the diameter of the branch flow passage 28 is determined depending on the maximum carriage speed of the recording apparatus 100, the diameter of the movable tube 73, or the size of the movable range of the carriage 3. In the present exemplary embodiment, the diameter of the flow passage hole 22*d* is φ3 and the diameter of the branch flow passage 28 is φ0.5.

Figure 12:
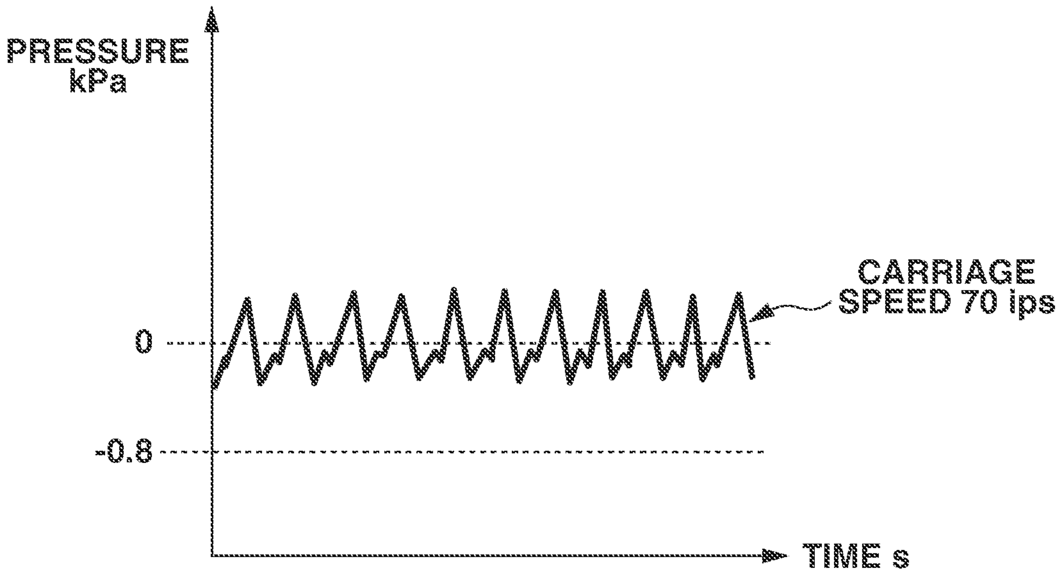
FIG. 12 is a graph illustrating a pressure fluctuation in the recording head of the recording apparatus including the ink flow passage on which the adjustment valve is disposed.

FIG. 12 is a graph illustrating a pressure fluctuation in the recording head 2 during the recording operation when the adjustment valve 24 is disposed. As illustrated in FIG. 12, the provision of the adjustment valve 24 in the middle of the ink flow passage makes it possible to reduce the pressure fluctuation on the ejection port surface 34 in the recording head 2 to about 0 kPa even when the carriage 3 moves for scanning at the movement speed of 70 ips. This configuration prevents the leakage of ink from the ejection ports due to the meniscus withstanding pressure in the recording head 2 (ejection ports), even when the carriage 3 is operated at a high speed.

Figure 13A:
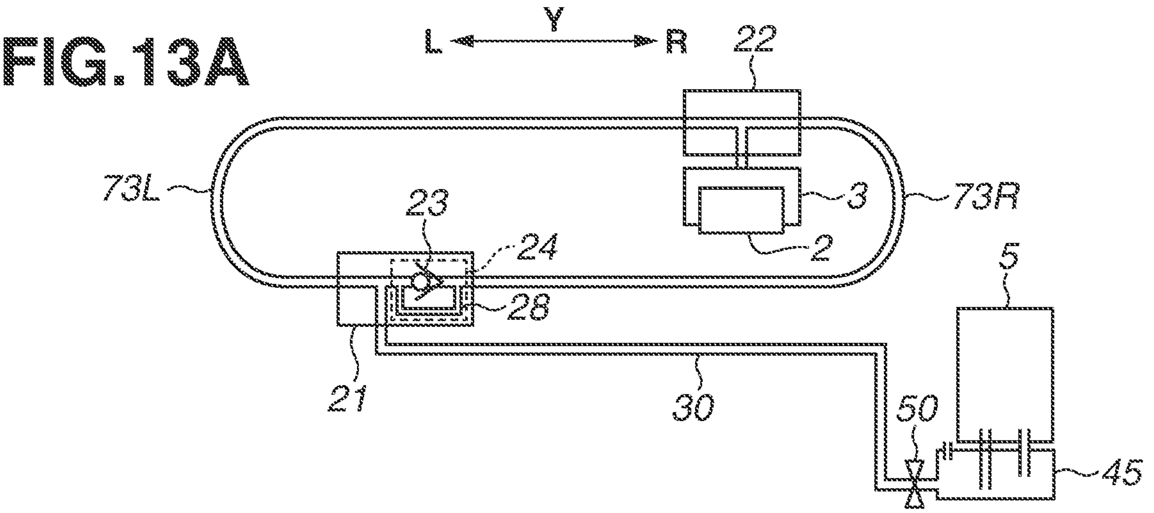
FIGS. 13A, 13B, and 13C each illustrate another example of the layout of the adjustment valve.
Figure 13B:
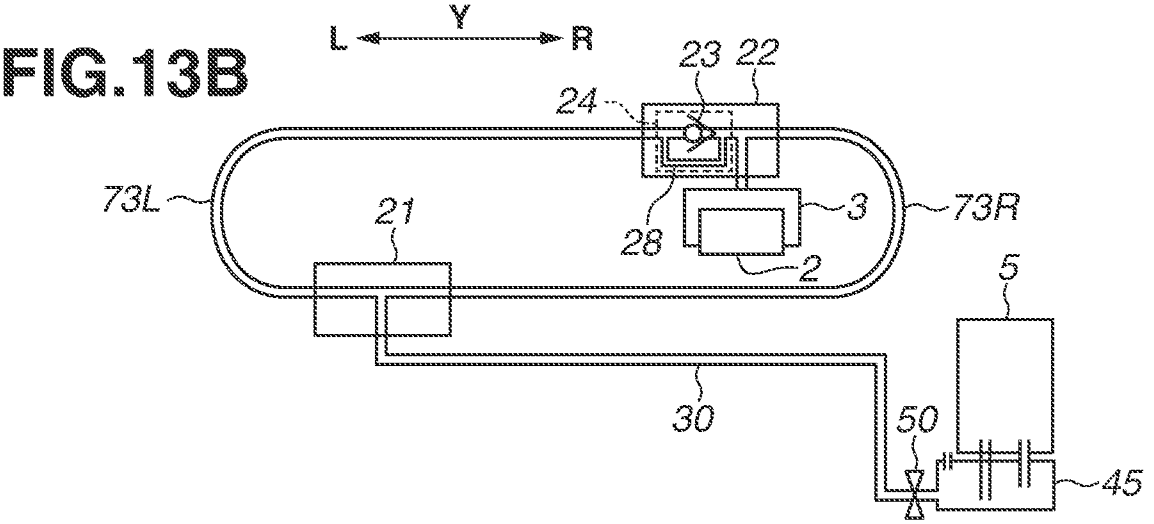
Figure 13C:
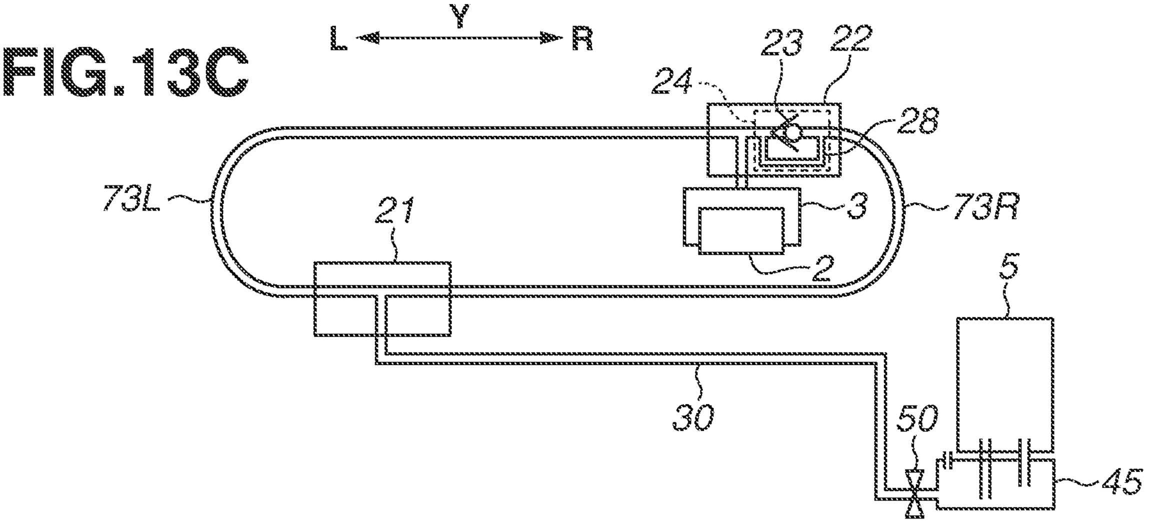

While the present exemplary embodiment is described above using the example where the adjustment valve 24 is disposed on the movable tube 73L side in the fixed portion joint 21, the present exemplary embodiment is not limited to this example. A pressure fluctuation to be added to ink can be suppressed in any layout in which the adjustment valve 24 operates in a direction in which the flow of ink into the recording head 2 is limited. FIGS. 13A, 13B, and 13C each illustrate another example of the layout of the adjustment valve 24.

FIG. 13A illustrates an example where the adjustment valve 24 is disposed on the movable tube 73R side in the fixed portion joint 21. FIG. 13B illustrates an example where the adjustment valve 24 is disposed on the movable tube 73L side in the carriage joint 22. FIG. 13C illustrates an example where the adjustment valve 24 is disposed on the movable tube 73R side in the carriage joint 22. In any of these examples, the flow rate of ink that flows toward the recording head 2 from one direction can be limited. Thus, it is possible to suppress a pressure fluctuation to be added to ink in the recording head 2 like in the present exemplary embodiment.

Layout of Adjustment Valve

Next, a desirable layout of the adjustment valve 24 will be descried with reference to FIGS. 14A to 14D and FIGS. 15A to 15D. FIGS. 14A to 14D each illustrate a comparative example in which ink is filled into the flow passage in a state where the adjustment valve 24 is disposed on the flow passage on the movable tube 73R side in the fixed portion joint 21. In other words, an initial filling operation for filling the flow passage and the recording head 2 with ink before the user uses the recording apparatus 100 will be described.

To fill the ink flow passage from the ink tank 5 to the recording head 2 with ink, the choke valve 50 is first closed and ink is sucked by the suction pump 36 for a predetermined period in a state where the ejection port surface 34 of the recording head 2 is sealed with the cap 31. After that, a valve-closing and suction operation for filling (sucking) ink with a negative pressure charged in the ink flow passage from the choke valve 50 to the suction pump 36 by opening the choke valve 50 is repeatedly executed.

Figure 14A:
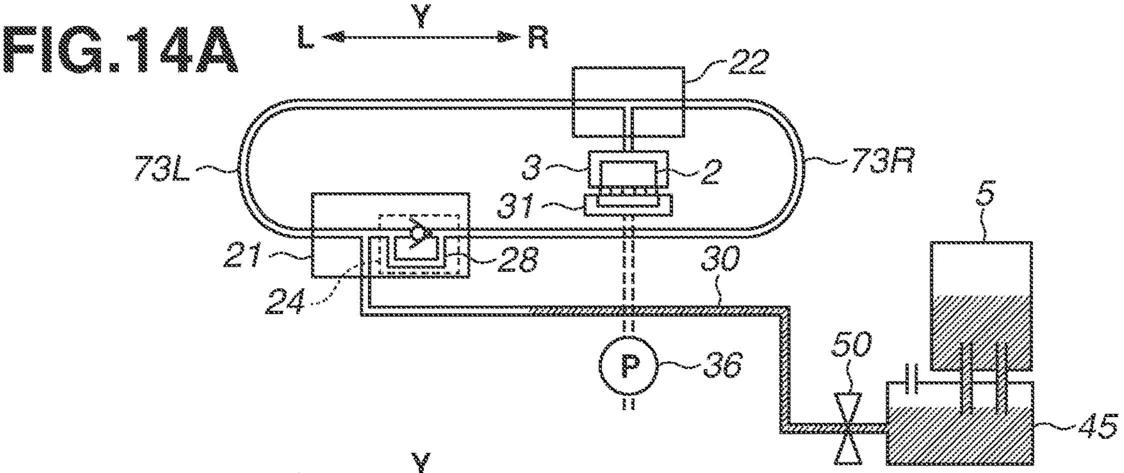
FIGS. 14A to 14D are schematic diagrams each illustrating a comparative example of the layout of the adjustment valve.
Figure 14B:
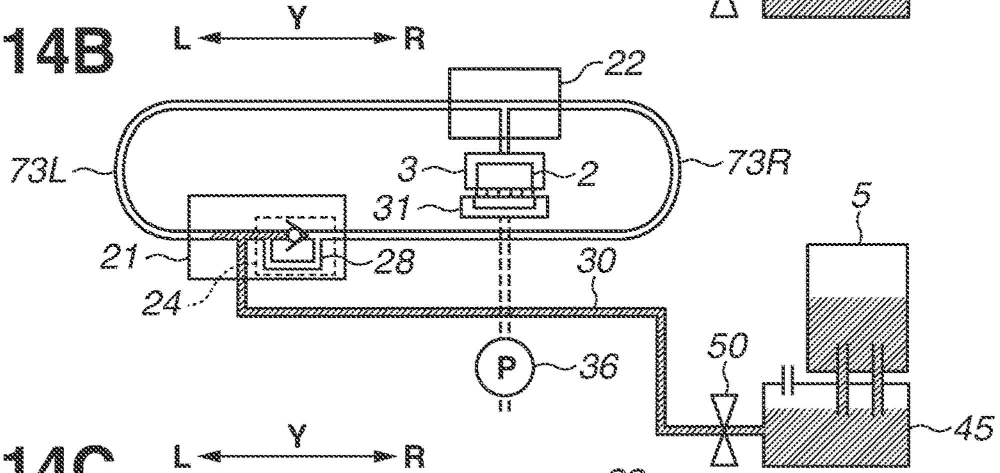
Figure 14C:
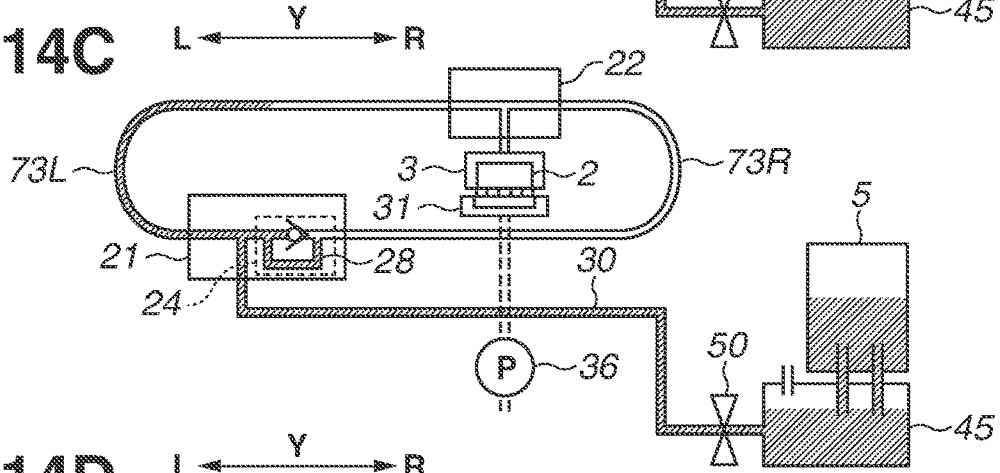
Figure 14D:
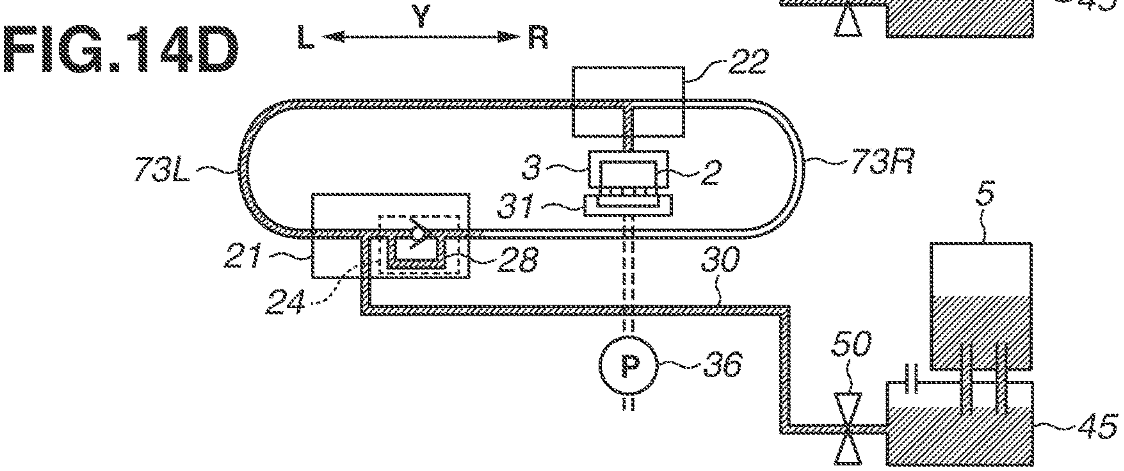
Figure 15A:
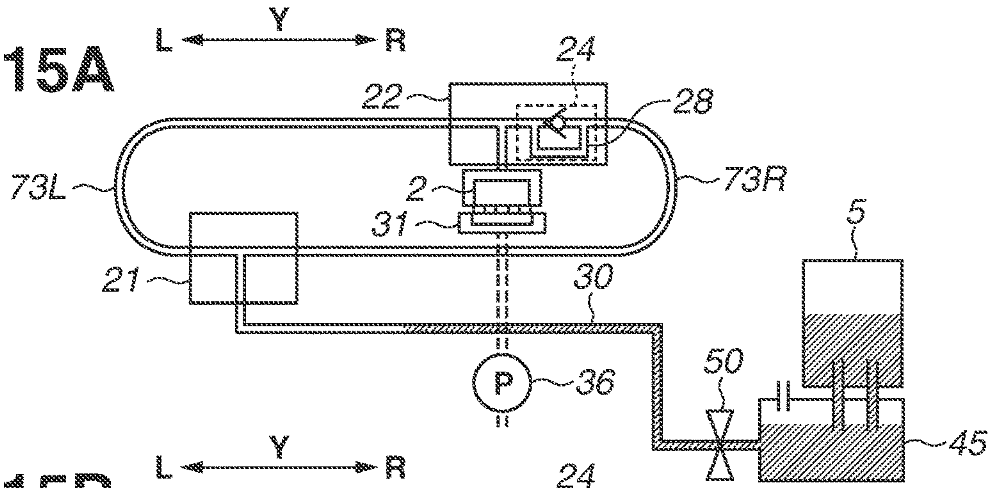
FIGS. 15A to 15D are schematic diagrams each illustrating a preferred layout of the adjustment valve.
Figure 15B:
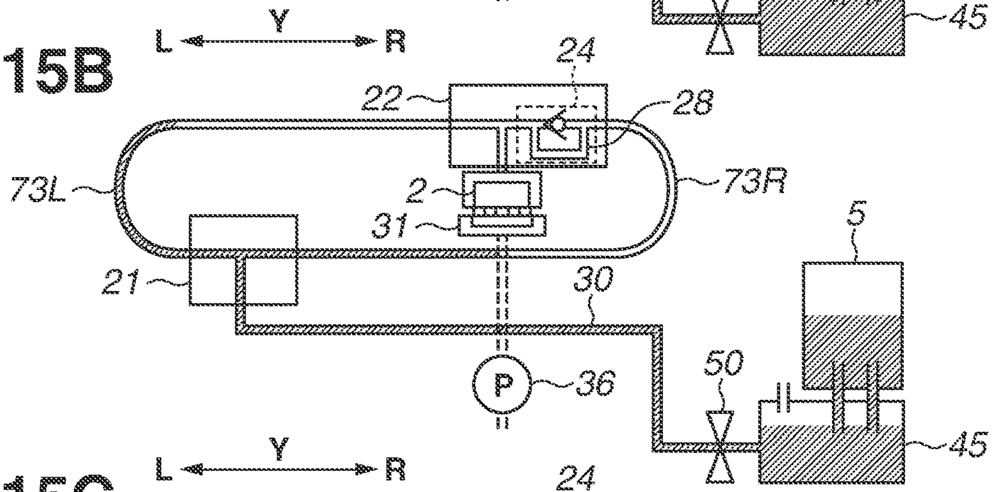
Figure 15C:
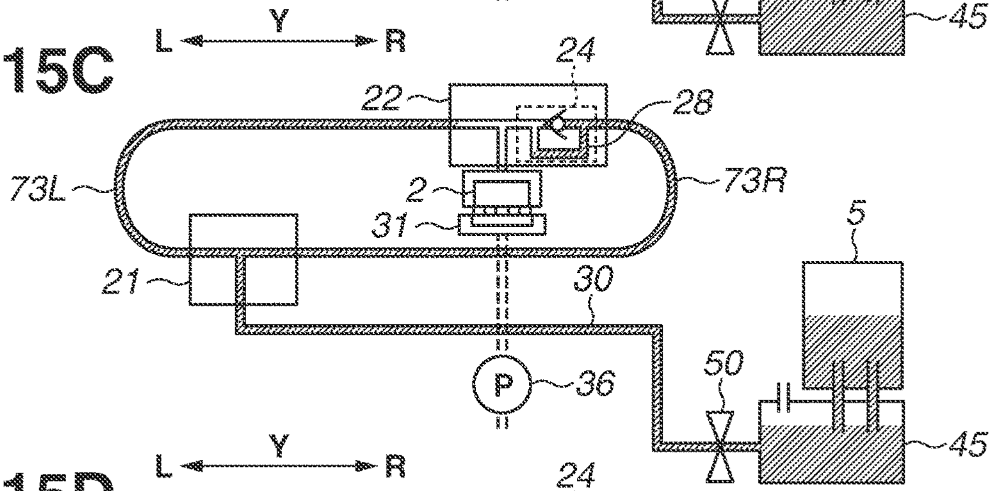
Figure 15D:
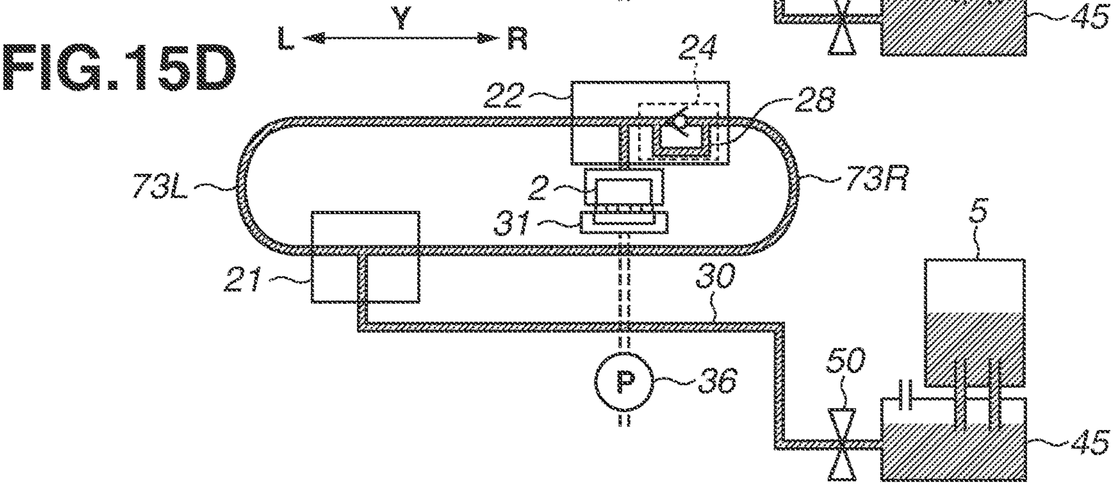

In the valve-closing and suction operation, the ink filling operation on the movable tube 73R side on which the adjustment valve 24 is disposed is executed through the branch flow passage 28 having a smaller pipe diameter, as illustrated in FIG. 14C, which results in a decrease in ink filling rate. Specifically, the smaller pipe diameter of the branch flow passage 28 causes a flow passage resistance, and a pressure loss difference occurs between the flow passage on the movable tube 73L side and the flow passage on the movable tube 73R side. Thus, as illustrated in FIG. 14D, the ink filling operation is delayed on the movable tube 73R side compared with the movable tube 73L.

In the present exemplary embodiment, the adjustment valve 24 is disposed on the flow passage on the movable tube 73R side in the carriage joint 22 as illustrated in FIG. 13C. FIGS. 15A to 15D each illustrate a state where ink is filled into the flow passage in a state where the adjustment valve 24 is disposed on the flow passage on the movable tube 73R side in the carriage joint 22.

Unlike in the comparative example illustrated in FIGS. 14A to 14D, the adjustment valve 24 is disposed in the vicinity of the recording head 2. Accordingly, no pressure loss difference occurs between the movable tube 73L and the movable tube 73R, and thus ink is filled substantially uniformly into the flow passages of the both movable tubes 73R and 73R up to the vicinity of the carriage joint 22. Accordingly, the period until all the flow passages are filled with ink can be reduced, as compared with the comparative example illustrated in FIGS. 14A to 14D.

In the comparative example illustrated in FIGS. 14A to 14D, the ink filling operation on the movable tube 73L side on which the adjustment valve 24 is not disposed is first completed, and, on the other hand, the flow passage is not completely filled with ink on the movable tube 73R side on which the adjustment valve 24 is disposed. At this time, an excess amount of ink can be sucked and discharged by the suction operation using the suction pump 36 from the flow passage on the movable tube 73L side on which the ink filling operation. To prevent this from occurring, the adjustment valve 24 can be provided on the movable tube 73R side in the carriage joint 22 so as to reduce the amount of ink to be discharged.

The exemplary embodiment is described above using the configuration in which the adjustment valve 24 is provided on the movable tube 73R side in the carriage joint 22. However, also in the configuration in which the adjustment valve 24 is provided on the movable tube 73L side as illustrated in FIG. 13B, the time required for the initial filling operation can be reduced in the similar manner to the above-described exemplary embodiment.

Ink Discharge Operation

Next, a discharge operation for discharging ink from the ink flow passage of the recording apparatus 100 which is filled with ink will be described with reference to FIGS. 16A to 18. The examples in FIGS. 16A to 16C and FIGS. 17A to 17C are described based on a configuration in which the adjustment valve 24 is provided on the movable tube 73R side in the carriage joint 22. The ink discharge operation is performed to prevent the filled ink from leaking out of the apparatus before the recording apparatus 100 in use is transported to another place (i.e., secondary transportation). FIG. 18 is a flowchart illustrating processing for controlling the ink discharge operation.

Figure 16A:
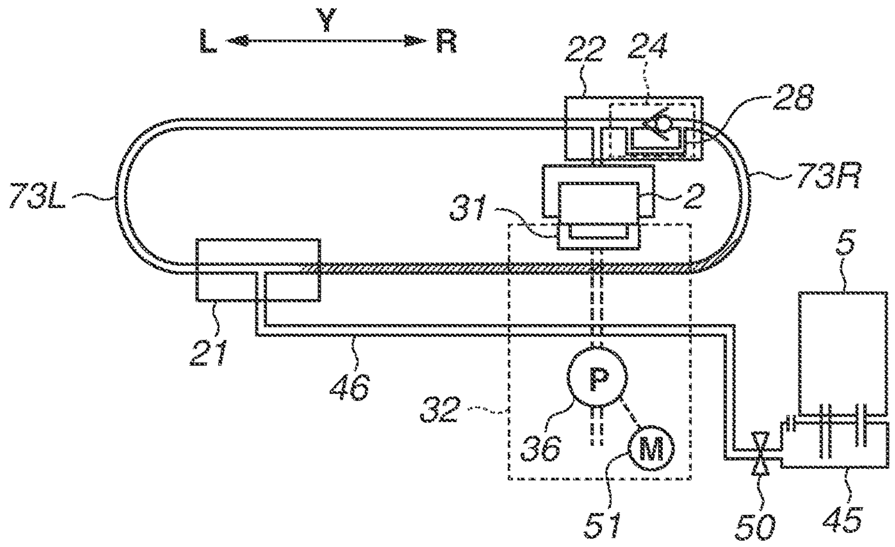
FIGS. 16A, 16B, and 16C are schematic diagrams each illustrating the ink flow passage during an ink discharge operation.

FIG. 16A is a schematic diagram illustrating a state of the recording apparatus 100 when the ink discharge operation in the ink flow passage is started. The ink discharge operation is performed such that the suction pump 36 is driven in a state where the ejection port surface 34 of the recording head 2 is sealed with the cap 31 to suck and discharge ink from the ejection ports. At this time, the flow passage on the movable tube 73R side on which the adjustment valve 24 is disposed has a larger flow passage resistance than that on the flow passage on the movable tube 73L side on which the adjustment valve 24 is not disposed. Accordingly, ink can remain in the flow passage on the movable tube 73R side as illustrated in FIG. 16A.

Figure 16B:
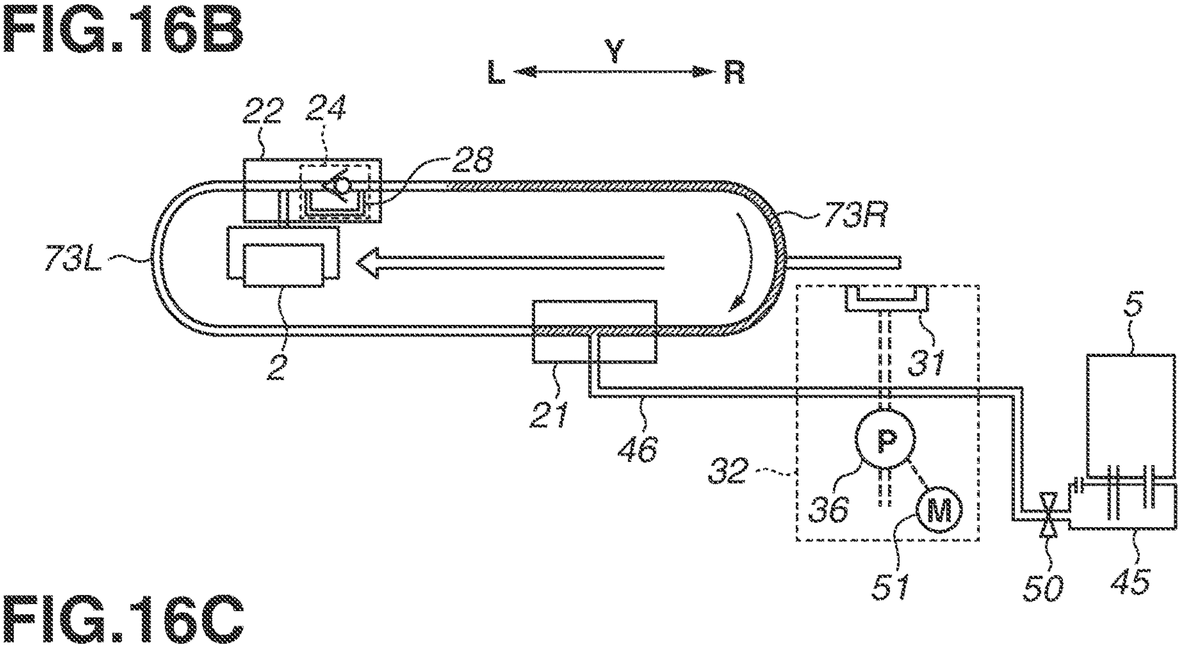

As illustrated in FIG. 16B, the carriage 3 is caused to move for scanning in the forward direction from the R-side on which the cap 31 is disposed to the L-side, and in step S110, the ink remaining in the movable tube 73R on which the adjustment valve 24 is disposed is moved by the inertia force. In this case, assume that the carriage 3 moves for scanning at a scanning speed VL.

Figure 16C:
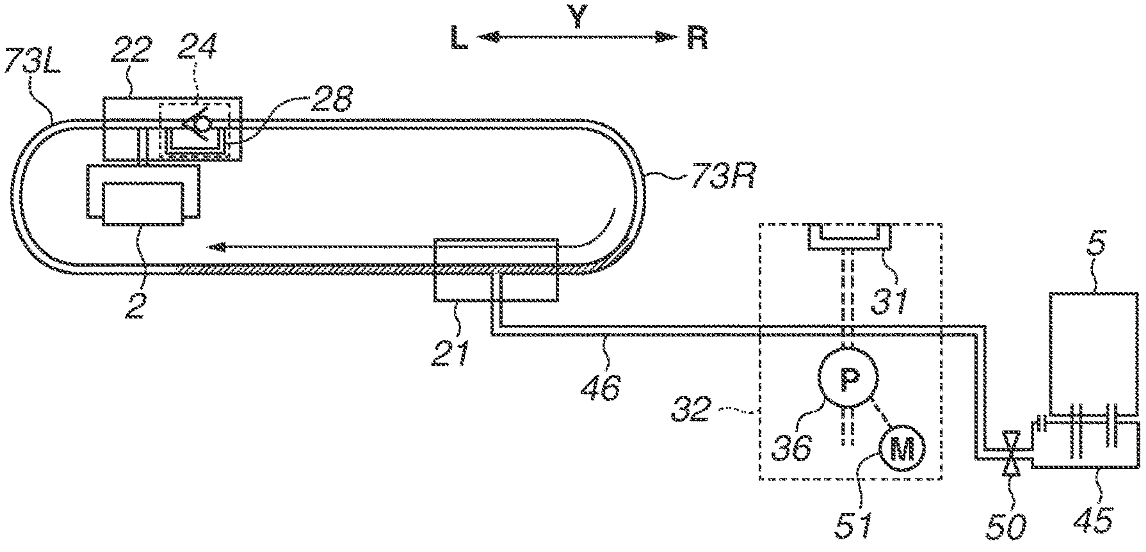

In step S120, the carriage 3 is caused to stop at the L-side end for a predetermined period TL. Then, as illustrated in FIG. 16C, the most of ink in the movable tube 73R is moved downward by gravity and reaches the movable tube 73L side. In this case, the predetermined period TL for which the carriage 3 stops at the L-side end is set depending on a period required for the ink in the movable tube 73R to move into the movable tube 73L. In the present exemplary embodiment, two minutes are set to the predetermined period TL for which the carriage 3 is caused to stop. A position where the carriage 3 stops at the L-side end is also referred to as a retracted position.

Figure 17A:
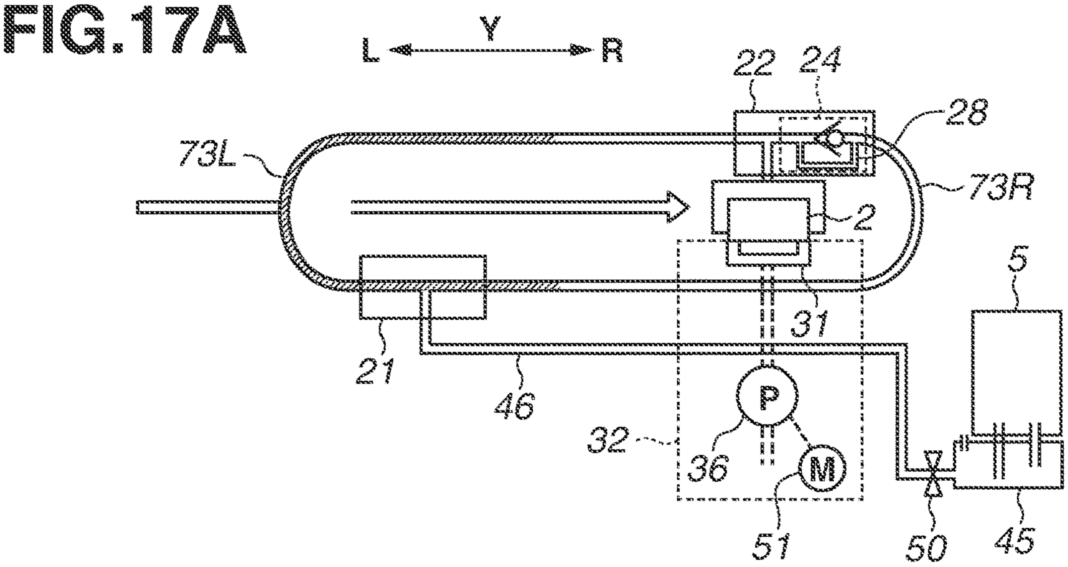
FIGS. 17A, 17B, and 17C are schematic diagrams each illustrating the ink flow passage during the ink discharge operation.
Figure 18:
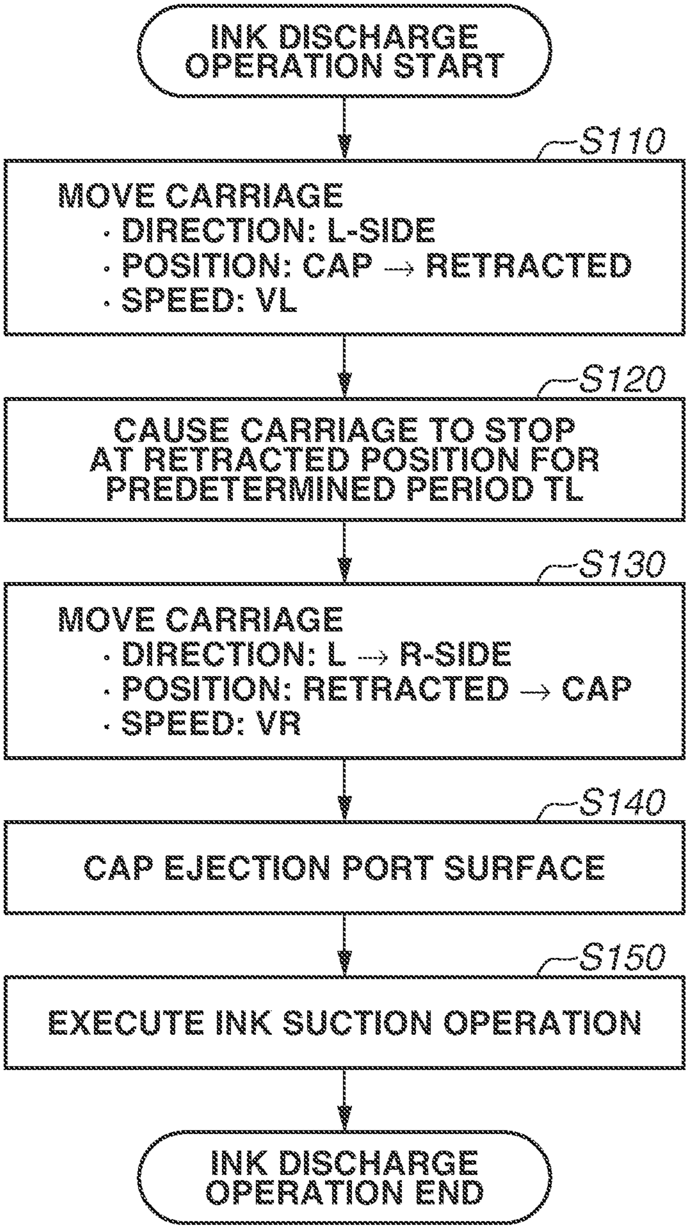
FIG. 18 is a flowchart illustrating processing for controlling the ink discharge operation.

Next, in step S130, the carriage 3 is moved toward the R-side in the reverse direction where the cap 31 is disposed, and then stops at a cap position where the recording head 2 is opposed to the cap 31 as illustrated in FIG. 17A. In this case, assume that the carriage 3 moves for scanning at a scanning speed VR.

Figure 17B:
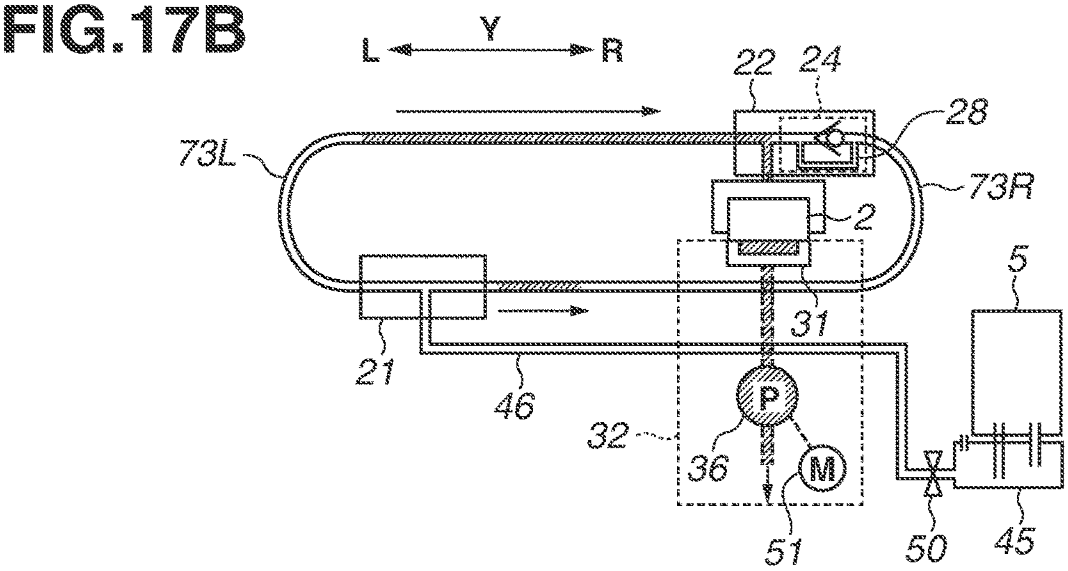
Figure 17C:
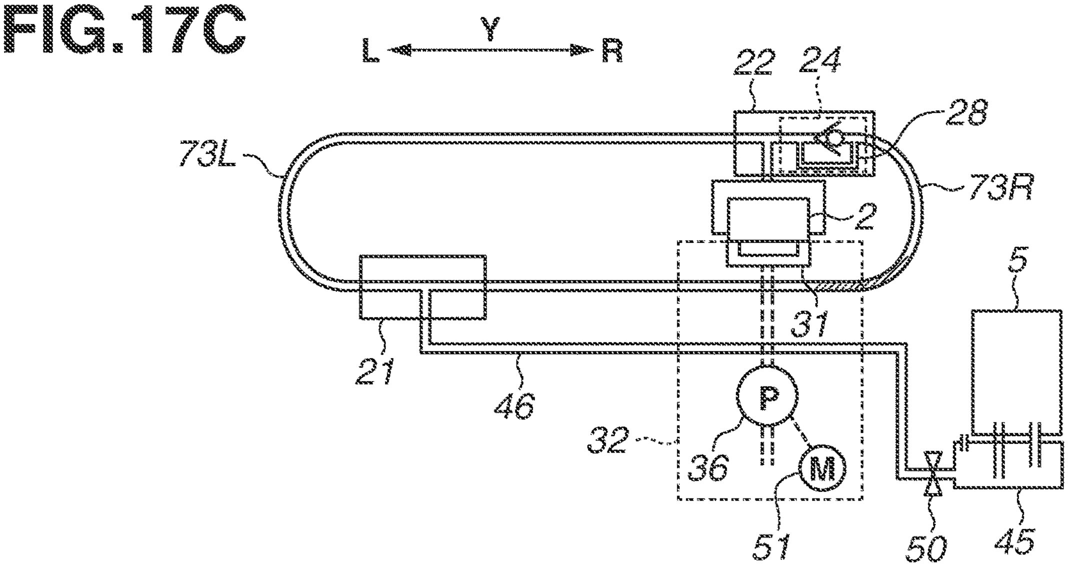

In step S140, the ejection port surface 34 of the recording head 2 is capped with the cap 31. Then in step S150, the suction pump 36 is driven to suck ink from the ejection ports, thereby discharging the ink that has moved into the movable tube 73L on which the adjustment valve 24 is not disposed, as illustrated in FIGS. 17B and 17C.

If ink still remains in the movable tube 73R even after the series of ink discharge operation illustrated in FIG. 18 is completed, this operation may be repeated a predetermined number of times. Further, the scanning speed VR for moving the carriage 3 from the retracted position to the cap position can be set to be higher than the scanning speed VL for moving the carriage 3 from the cap position to the retracted position. This makes it possible to reduce the time for sucking the ink that has moved into the movable tube 73L, thereby preventing the ink from flowing back to the movable tube 73R by gravity.

While the ink discharge operation flow is described above based on the configuration example in which the adjustment valve 24 is disposed in a system in which the ink tank 5 and the recording head 2 are connected with a loop-shaped tube, the ink discharge operation flow can also be applied to any ink flow passage on which the adjustment valve 24 is not disposed. For example, in a configuration in which a flow passage with a small diameter is provided in the middle of the ink flow passage, a pressure loss also occurs, like in the case where the adjustment valve 24 is disposed, and thus the flow rate of ink can be limited. Accordingly, the above-described ink discharge operation can also be applied to such a configuration, thereby making it possible to efficiently discharge ink from the entire ink flow passage.

As described above, in the configuration in which the flow passage on which a pressure loss occurs is provided in the loop-shaped ink flow passage connected to the carriage 3, the carriage 3 is caused to reciprocate and then the ink suction operation is executed. This makes it possible to reduce the amount of residual ink in the ink flow passage with a flow passage resistance difference.

Figure 19:
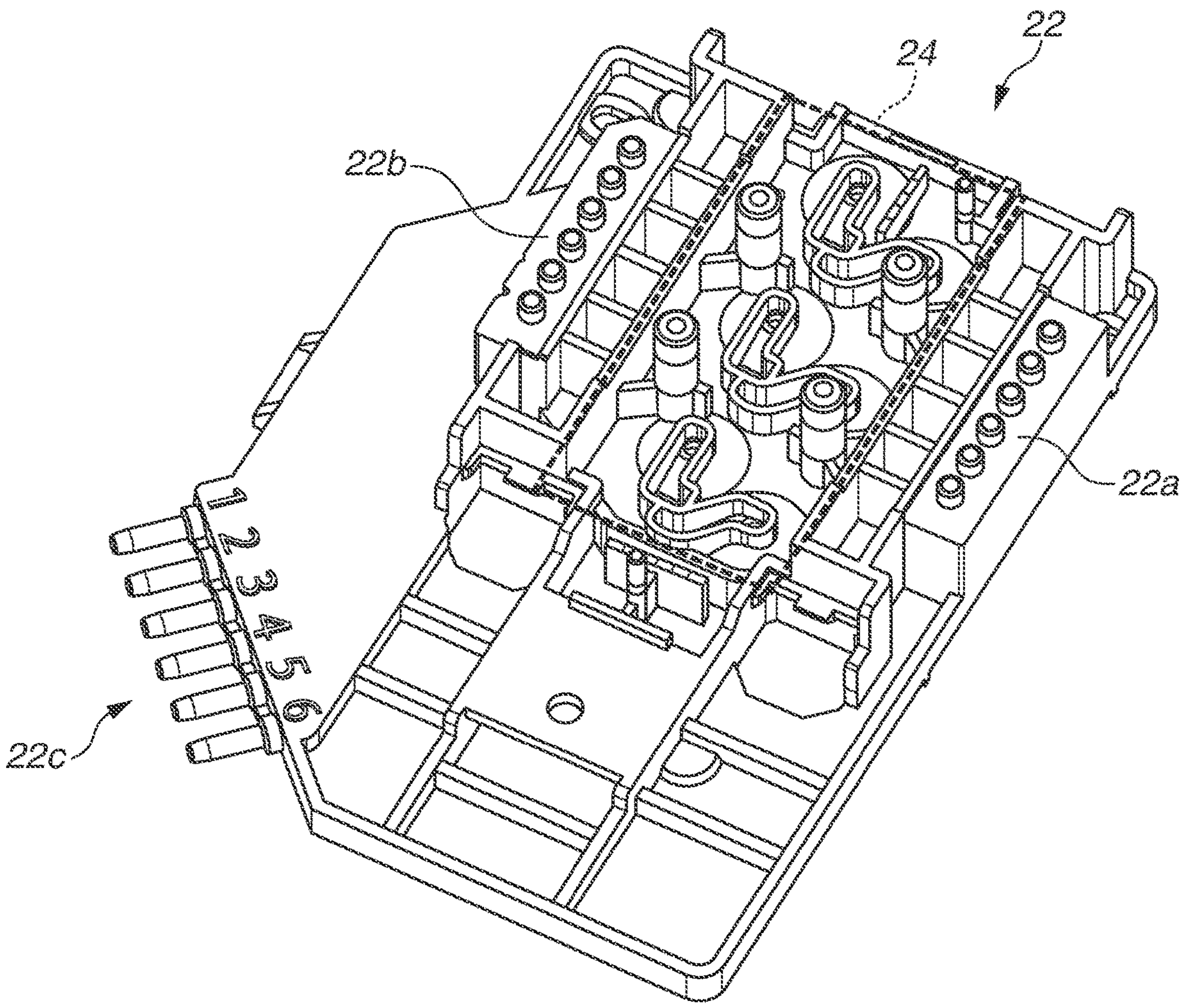
FIG. 19 is a top perspective view illustrating a configuration of a carriage joint according to a second exemplary embodiment.

In a second exemplary embodiment, a structure of the adjustment valve 24 different from that in the first exemplary embodiment will be described with reference to FIGS. 19 to 22B. In the second exemplary embodiment, the adjustment valve 24 is provided in the carriage joint 22. FIG. 19 is a top perspective view illustrating the configuration of the carriage joint 22 according to the second exemplary embodiment. A connection portion 22*a* is connected to the movable tube 73R. A connection portion 22*b* is connected to the movable tube 73L. A connection portion 22*c* is connected to the carriage tube 33. These connection portions 22*a* to 22*c* are provided for each color of ink. Further, the adjustment valve 24 is formed for each flow passage in the carriage joint 22.

Figure 20A:
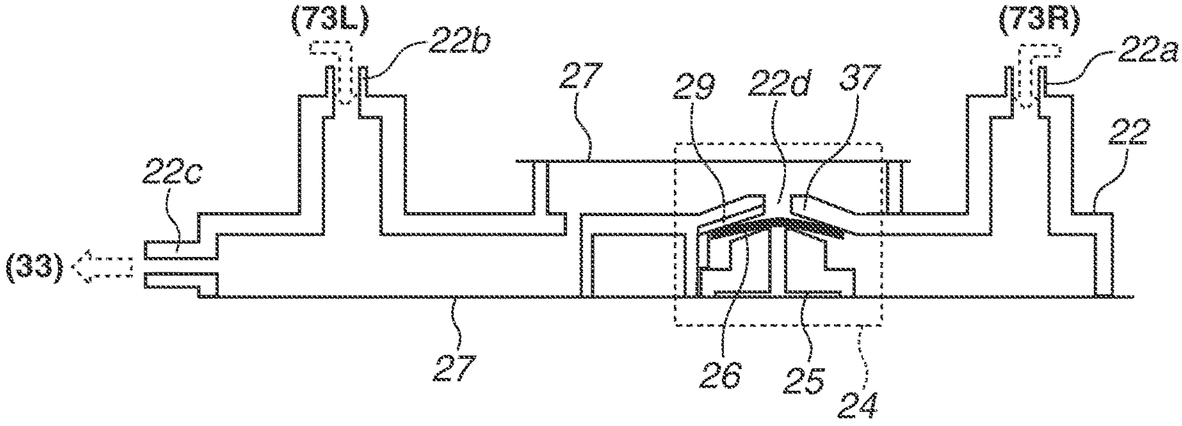
FIGS. 20A and 20B are sectional views each illustrating a flow passage in the carriage joint provided with an adjustment value according to the second exemplary embodiment.
Figure 20B:
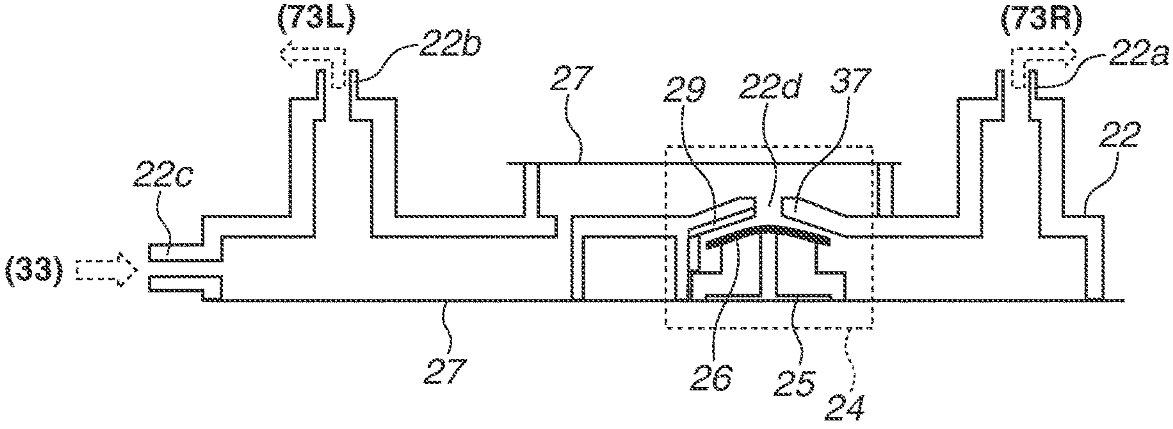
Figure 21A:
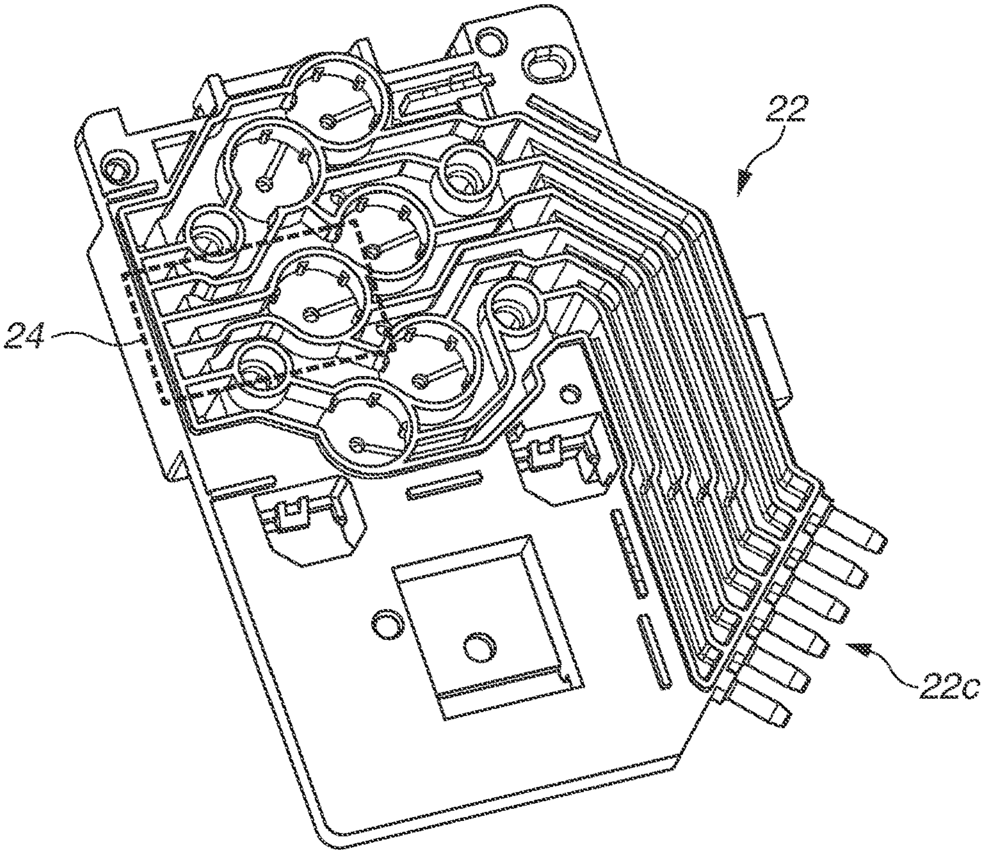
FIGS. 21A and 21B each illustrate a detailed configuration of the carriage joint according to the second exemplary embodiment.
Figure 21B:
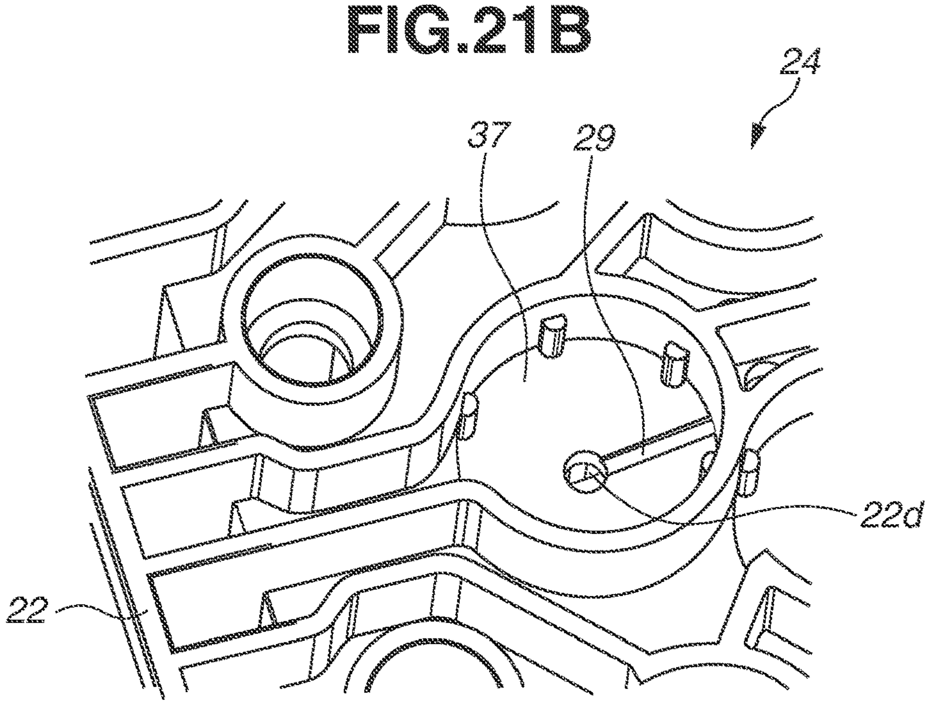

Next, the configuration of the adjustment valve 24 will be described with reference to FIGS. 20A and 20B and FIGS. 21A and 21B. FIGS. 20A and 20B are sectional views each illustrating the flow passage in the carriage joint 22 where the adjustment valve 24 is provided. FIG. 21A is a rear perspective view of the carriage joint 22. FIG. 21B is an enlarged view illustrating a peripheral portion of the adjustment valve 24.

The ink flow passage in the carriage joint 22 is formed by the carriage joint 22 and the welded films 27 that are welded to the carriage joint 22. The adjustment valve 24 is provided in the middle on the ink flow passage. The carriage joint 22 is provided with the conical-shaped valve receiving portion 37, and the circular valve sheet 26 is disposed at the position opposed to the valve receiving portion 37. The flow passage hole 22*d* through which ink passes is formed at the center of the valve receiving portion 37. The valve cover 25 is disposed below the valve sheet 26 and the valve sheet 26 is urged against the valve receiving portion 37 by a rib of the valve cover 25. As illustrated in FIGS. 21A and 21B, in the valve receiving portion 37 according to the second exemplary embodiment, an adjustment valve groove 29, which is narrower than the flow passage hole 22*d*, is formed in an outer diameter direction from the flow passage hole 22*d*.

Figure 22A:
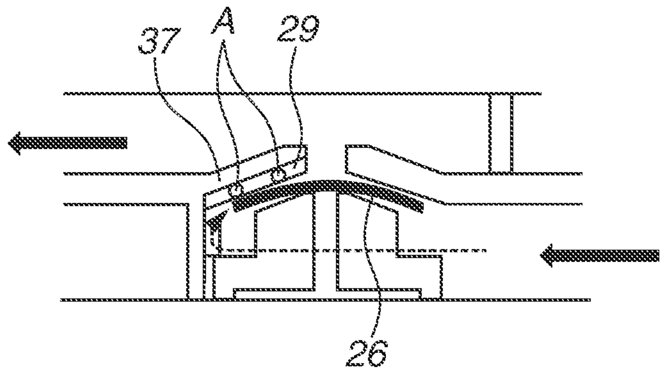
FIGS. 22A and 22B are schematic diagrams each illustrating a detailed configuration of the adjustment valve according to the second exemplary embodiment.
Figure 22B:
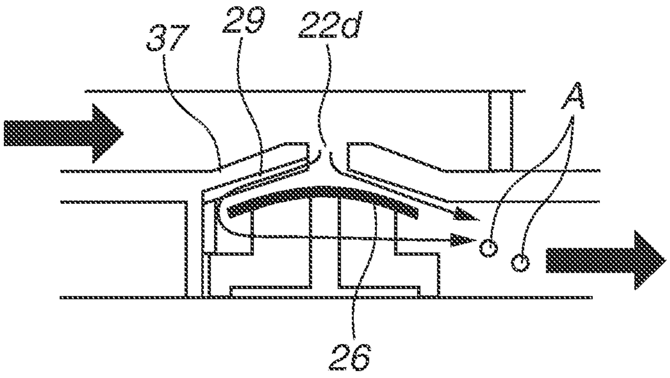

FIGS. 22A and 22B are enlarged schematic sectional views each illustrating a portion of the adjustment valve 24 illustrated in FIGS. 20A and 20B. FIG. 22A illustrates a state where ink flows in the direction toward the recording head 2 from the movable tube 73R.

Like in the first exemplary embodiment, if ink is to flow toward the recording head 2, the flow of ink brings the valve sheet 26 into close contact with the valve receiving portion 37. However, the adjustment valve groove 29 provided in the valve receiving portion 37 is not in close contact with the valve sheet 26, and thus ink flows through the portion corresponding to the adjustment valve groove 29.

The adjustment valve groove 29 is provided on the recording head 2 side of the flow passage hole 22*d*, and thus the ink flows toward the recording head 2 while passing through the portion below the valve sheet 26. This flow of ink causes a force to act in the direction in which the valve sheet 26 is brought into closer contact with the valve receiving portion 37. Since the diameter of the adjustment valve groove 29 is smaller than those of the other flow passages, a pressure loss occurs when ink passes through the adjustment valve groove 29, and thus the flow rate is limited. Accordingly, the flow rate can be controlled so that the flow rate of ink that flows toward the recording head 2 can be decreased by providing the adjustment valve groove 29 instead of the branch flow passage 28 according to the first exemplary embodiment. Therefore, a pressure rise in the recording head 2 can be suppressed like in the first exemplary embodiment.

FIG. 22B illustrates a state where ink flows in the direction toward the movable tube 73R from the recording head 2. When ink flows from the recording head 2 through the movable tube 73R, the valve sheet 26 is apart from the valve receiving portion 37 and ink flows in the gap formed between the valve sheet 26 and the valve receiving portion 37.

In this case, gas dissolved in ink can appear as air bubbles in the ink flow passage due to a change in temperature or atmospheric pressure. The air bubbles are more likely to be trapped in a narrower flow passage, and the air bubbles trapped in the narrower flow passage generate a resistance when ink flows and, as a result, inhibit the flow of ink. In the second exemplary embodiment, as illustrated in FIG. 22A, air bubbles A are trapped in the adjustment valve groove 29 in a state where the adjustment valve 24 is closed. However, when ink flows toward the movable tube 73R from the recording head 2 as illustrated in FIG. 22B, the valve sheet 26 is pressed down and the ink flow passage is enlarged, thereby allowing the trapped air bubbles A to flow.

With the configuration in which a groove such as the adjustment valve groove 29 is formed as described above, it is possible to prevent air bubbles from being trapped in the adjustment valve 24 while limiting the flow rate of ink that flows toward the recording head 2. It is therefore possible to provide an ink supply system with high reliability in which a pressure rise in the recording head 2 can be suppressed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-166311, filed Sep. 30, 2020, which is hereby incorporated by reference herein in its entirety.

What is claimed is:

1. A recording apparatus comprising:
a recording head mounted on a carriage and configured to eject liquid, wherein the carriage is configured to reciprocate in a first direction along a scanning direction and in a second direction opposite to the first direction;
a tank configured to contain liquid to be supplied to the recording head;
a first flow passage, which is connected to a carriage joint mounted on the carriage, configured to flow liquid from the tank to the recording head;
a second flow passage, which is connected to the carriage joint mounted on the carriage, configured to flow liquid from the tank to the recording head;
a third flow passage, one end of which is connected to the first flow passage and the second flow passage and another end of which is connected to the recording head, configured to supply liquid to the recording head by flowing the liquid from the one end to the other end;
a suction unit configured to suck liquid from the recording head; and
a control unit configured to control the suction unit to suck liquid from the recording head after the carriage (i) moves in the first direction, (ii) stops for a predetermined period, and (iii) moves in the second direction.

2. The recording apparatus according to claim 1, wherein the first flow passage has a flow passage resistance that is larger than a flow passage resistance of the second flow passage.

3. The recording apparatus according to claim 2, further comprising a valve provided in the first flow passage,
wherein the valve is configured to limit a flow of liquid from the tank to the recording head and is configured to allow liquid to flow from the recording head to the tank.

4. The recording apparatus according to claim 3, wherein the valve is disposed near the recording head.

5. The recording apparatus according to claim 1, wherein a speed at which the carriage moves in the second direction is higher than a speed at which the carriage moves in the first direction.

6. The recording apparatus according to claim 1, wherein the suction unit includes a cap configured to cap an ejection port surface on which an ejection port of the recording head is provided, and includes a pump connected to the cap, and
wherein the control unit controls the carriage to move in the second direction and stop at a position where the recording head opposes to the cap and controls the suction unit to suck liquid from the recording head.

7. The recording apparatus according to claim 1, wherein the first flow passage and the second flow passage form a loop-shaped flow passage extending on a plane defined by the scanning direction and a gravitational direction.

8. The recording apparatus according to claim 1, wherein the control unit controls the suction unit to suck liquid from the recording head after the carriage is stopped at a position where the recording head opposes to the suction unit.

9. The recording apparatus according to claim 1,
wherein the first flow passage and the second flow passage are branched off from a fixed flow passage,
wherein the tank includes a first tank detachably mountable on the recording apparatus, and a second tank fixed to the recording apparatus and configured to contain liquid supplied from the first tank, and
wherein the fixed flow passage is connected to the second tank.

10. The recording apparatus according to claim 1, wherein the first flow passage and the second flow passage are branched off from a fixed flow passage which is connected to the tank and is fixed to an inside of the recording apparatus with a fixed portion joint.

11. The recording apparatus according to claim 10, wherein the first flow passage and the second flow passage are configured to follow the movement of the carriage, and the fixed flow passage is configured not to follow the movement of the carriage.

12. The recording apparatus according to claim 1, wherein, in a case where the recording apparatus is transported, the control unit controls the suction unit to suck liquid from the recording head.

13. A control method for a recording apparatus,
wherein the recording apparatus includes:
a recording head mounted on a carriage and configured to eject liquid, wherein the carriage is configured to reciprocate in a first direction along a scanning direction and in a second direction opposite to the first direction,
a tank configured to contain liquid to be supplied to the recording head,
a first flow passage, which is connected to a carriage joint mounted on the carriage, configured to flow liquid from the tank to the recording head,
a second flow passage, which is connected to the carriage joint mounted on the carriage, configured to flow liquid from the tank to the recording head, and
a third flow passage, one end of which is connected to the first flow passage and the second flow passage and another end of which is connected to the recording head, configured to supply liquid to the recording head by flowing the liquid from the one end to the other end,
the control method comprising:
controlling, as a first controlling, the carriage to move in the first direction and to stop for a predetermined period;
controlling, as a second controlling after the first controlling, the carriage to move in the second direction; and
sucking liquid from the recording head after the second controlling.

14. The control method according to claim 13, wherein a speed at which the carriage moves in the second direction in the second controlling is higher than a speed at which the carriage moves in the first direction in the first controlling.

15. The control method according to claim 13, wherein the first flow passage and the second flow passage are branched off from a fixed flow passage which is connected to the tank and is fixed to an inside of the recording apparatus with a fixed portion joint.

16. The control method according to claim 15, wherein the first flow passage and the second flow passage are configured to follow the movement of the carriage, and the fixed flow passage is configured not to follow the movement of the carriage.

17. The control method according to claim 13, wherein the recording apparatus further includes a cap configured to cap an ejection port surface on which an ejection port of the recording head is provided, the control method further comprising:

controlling, as a third controlling after the second controlling, the carriage to stop at a position where the recording head opposes to the cap; and executing the sucking after the third controlling.

* * * * *